US005400065A

United States Patent [19]

Tomono et al.

[11] Patent Number: 5,400,065

[45] Date of Patent: Mar. 21, 1995

[54] METHOD AND APPARATUS FOR FORMING IMAGE ON A MEMBER WITH IMAGE FORMING LIQUID BY SELECTIVE APPLICATION OF HEAT AND/OR PRESSURE

[75] Inventors: Hidenori Tomono; Yasuo Katano; Hiromichi Komai, all of Yokohama; Kiyofumi Nagai, Machida; Takashi Kimura, Yokohama; Minoru Morikawa, Kawasaki; Megumi Kawahara, Yokohama, all of Japan

[73] Assignee: Ricoh Company, Ltd., Tokyo, Japan

[21] Appl. No.: 49,491

[22] Filed: Apr. 19, 1993

[30] Foreign Application Priority Data

| | | | |
|---|---|---|---|
| Apr. 20, 1992 | [JP] | Japan | 4-126814 |
| May 20, 1992 | [JP] | Japan | 4-127599 |
| Jul. 31, 1992 | [JP] | Japan | 4-205347 |
| Aug. 25, 1992 | [JP] | Japan | 4-226074 |
| Aug. 25, 1992 | [JP] | Japan | 4-226289 |
| Feb. 10, 1993 | [JP] | Japan | 5-022933 |

[51] Int. Cl.$^6$ .................. G01D 15/10

[52] U.S. Cl. .................. 347/172; 101/470; 101/DIG. 29

[58] Field of Search .................. 101/467, 470, DIG. 29, 101/DIG. 37; 346/76 PH; 430/200, 348

[56] References Cited

U.S. PATENT DOCUMENTS

| | | | |
|---|---|---|---|
| 4,833,990 | 5/1989 | Hirt et al. | 101/467 X |
| 4,846,065 | 7/1989 | Mayrhofer et al. | 101/453 |
| 5,115,254 | 5/1992 | Onishi et al. | 346/76 PH |
| 5,129,321 | 7/1992 | Fadner | 346/74.2 X |

*Primary Examiner*—R. L. Moses

*Attorney, Agent, or Firm*—Cooper & Dunham

[57] ABSTRACT

An image forming method including the steps of bringing an image-forming liquid in which finely-divided resin particles are dispersed in a dispersion medium into contact with an image-bearing member capable of repelling the dispersion medium of the image-forming liquid, and selectively applying heat and/or pressure to the image-bearing member or the image-forming liquid by use of a heat-application system and/or pressure-application system in accordance with signals corresponding to an image to be formed to deposit imagewise the finely-divided resin particles in the image-forming liquid on the surface of the image-bearing member, thereby obtaining a resin image corresponding to the image on the image-bearing member. In addition, an image forming apparatus for the above-mentioned image forming method is disclosed.

21 Claims, 28 Drawing Sheets

METHOD AND APPARATUS FOR FORMING IMAGE ON A MEMBER WITH IMAGE FORMING LIQUID BY SELECTIVE APPLICATION OF HEAT AND/OR PRESSURE

BACKGROUND OF THE INVENTION

1. Field of the Invention

The present invention relates to a method for forming images by depositing finely-divided resin particles on the surface of an image-bearing member, and an image forming apparatus in which the above-mentioned image forming method is carried out.

2. Discussion of Background

The offset printing is conventionally utilized to obtain a small quantity of copied materials. A master plate for use in the offset printing is generally prepared by the following methods, but these methods have their own disadvantages:

(1) The master is prepared from a presensitized (PS) plate.

This method necessitates a light source of laser, so that the apparatus for preparing the master is made complicated. In addition, some chemical treatment is necessary at the final stage of the preparation of the master.

(2) The master is prepared in accordance with Electrofax in the field of electrophotography.

In this method, a latent electrostatic image is first formed on a recording member in which zinc oxide is dispersed. The latent electrostatic image thus formed is developed with a toner to obtain a visible toner image, and then toner-image portions or the background of the recording member is subjected to hydrophilic treatment to apply a printing ink thereto. This process for preparation of the master is thus also made complicated.

To solve the problem of the complicated process for preparing the master, the following master-preparation methods are proposed:

(3) The master is prepared by attaching an ink sheet to a sheet-shaped base material for the master, and selectively applying heat to the ink sheet to thermally transfer the ink component in the ink sheet to the base material (Japanese Laid-Open Patent Applications 54-143303, 63-60752 and 2-217247).

According to this method, the master is available in the form of a sheet. Therefore, once the sheet-shaped master is subjected to the printing, it cannot be repeatedly used. Consequently, the printing cost is increased.

(4) The master is prepared by transferring an ink to the base material for the master, the ink to which the viscosity can be imparted depending upon the change of the pH value thereof (Japanese Laid-Open Patent Application 1-166959).

In this method, the printing speed cannot be increased because the ink transferred to the base material for the master has relatively high viscosity.

Furthermore, the following image forming methods, that is, the master preparation methods, are conventionally proposed:

(5) The master is prepared by depositing a thermofusible ink in the form of particles on an image-bearing member with the application of heat thereto to form images thereon. The thus formed images are transferred to a recording sheet by the application of heat or pressure thereto (Japanese Laid-Open Patent Application 62-279966).

This method has the shortcomings that the scattering of ink often occurs in the apparatus because the ink is used in the form of particles, and that it is difficult to prevent the ink deposition on the background because the ink is easily attached to a non-image area by the electrostatic force.

(6) The master is prepared by bringing a liquid-type ink capable of increasing the viscosity upon application of heat thereto into contact with an ink-repellent image-bearing member, and selectively applying heat thereto, thereby forming ink images on the image-bearing member. Then, the ink images are transferred to a recording sheet (Japanese Laid-Open Patent Applications 3-227255 and 4-45955).

The image forming method (6) has the following disadvantages:

(i) It is necessary to provide convex and concave portions on the surface of the ink-repellent image-bearing member. Therefore, the cleaning of the surface of the image-bearing member is difficult, and consequently, the image quality is impaired.

(ii) In the case where the viscosity of the liquid-type ink is increased by causing a solvent component therein to evaporate by the application of heat thereto, the evaporation of the solvent necessitates a relatively long period of heating time.

(iii) In the case where the viscosity of the liquid-type ink is increased by containing in the ink a material of which solubility decreases with the elevation of temperature, a relatively long period of heating time is required.

(iv) In the case where the viscosity of the liquid-type ink is increased by causing gelation of the ink upon application of heat thereto, moderate heating is required to cause the gelation at a relatively low temperature, which necessitates a long period of heating time.

SUMMARY OF THE INVENTION

Accordingly, a first object of the present invention is to provide a method for readily forming images at low cost without the above-mentioned conventional problems.

A second object of the present invention is to provide an image forming apparatus in which the above-mentioned image forming method can be carried out.

The above-mentioned first object of the present invention can be achieved by an image forming method comprising the steps of bringing an image-forming liquid comprising a dispersion medium and finely-divided resin particles dispersed in the dispersion medium into contact with an image-bearing member capable of repelling the dispersion medium of the image-forming liquid, and selectively applying heat and/or pressure to the image-bearing member or the image-forming liquid by use of a heat-application means and/or pressure-application means in accordance with signals corresponding to an image to be formed, to deposit imagewise finely-divided resin particles in the image-forming liquid on the surface of the image-bearing member, thereby obtaining a resin image corresponding to the aforementioned image on the image-bearing member.

The second object of the present invention can be achieved by an apparatus for forming a resin image on the surface of an image-bearing member by depositing finely-divided resin particles dispersed in a dispersion medium of an image-forming liquid on the surface of the image-bearing member capable of repelling the dispersion medium of the image-forming liquid, which comprises means for storing the image-forming liquid comprising the dispersion medium and the finely-divided resin particles dispersed in the dispersion medium; means for supplying the image-forming liquid in the above-mentioned storing means to the image-bearing member in such a fashion that the surface of the image-bearing member comes in contact with the image-forming liquid; means for selectively applying heat and/or pressure to the image-bearing member or the image-forming liquid, with the image-forming liquid being in contact with the image-bearing member; and means for controlling the above-mentioned heat-application and/or pressure-application means in accordance with signals corresponding to an image to be formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 31(*b*) is a cross-sectional view taken along the line B—B in FIG. 31(*a*);

DESCRIPTION OF THE PREFERRED EMBODIMENTS

The image-forming liquid for use in the image forming method of the present invention comprises a dispersion medium, and finely-divided resin particles, such as colloidal resin particles, dispersed in the dispersion medium. According to the image forming method of the present invention, when heat and/or pressure is applied to the image-bearing member or the image-forming liquid, with the image-forming liquid in contact with the recording surface of the image-bearing member, not only the adhesion between the finely-divided resin particles, but also the adhesion of the resin particles to the surface of the image-bearing member is increased. The resin particles can therefore be deposited on the recording surface of the image-bearing member, thereby forming resin images thereon. It is supposed that the increase in the adhesion between the finely-divided resin particles, and the increase in the adhesion of the resin particles to the surface of the image-bearing member result from the following factors:

(1) The finely-divided resin particles coagulate when the heat is applied thereto.

The dispersion stability of finely-divided resin particles in the dispersion medium can be maintained by keeping a balance of the repulsive force of the electrically charged particles and the attractive force between the molecules induced by the van der Waals force. When the heat is applied to the image-forming liquid, the repulsive force of the electrically charged resin particles is weakened, which destroys the above-mentioned balance. Thus, the finely-divided resin particles lose the dispersion stability and are apt to coagulate.

(2) The finely-divided resin particles adhere to each other when the pressure is applied thereto.

When the above-mentioned two phenomenons, that is, the coagulation of the finely-divided resin particles by the application of heat thereto, and the adhesion thereof by the application of pressure thereto, are caused independently or simultaneously, the adhesive force between the finely-divided resin particles is increased. Such a large adhesive force between the resin particles can be obtained when the image-forming liquid is a dispersion of the finely-divided resin particles, not a resin solution as disclosed in the previously mentioned Japanese Laid-Open Patent Applications 3-227255 and 4-45955. In particular, a dispersion of resin colloidal particles is preferably used in the present invention. The preferable particle diameter of the resin particles dispersed in the image-forming liquid for use in the present invention is 0.01 to 10 μm. In addition, when the image formation is carried out mainly by applying pressure to the above-mentioned image-forming liquid, it is preferable that the glass transition temperature or softening point of the finely-divided resin particles in the image-forming liquid be lower than the temperature at which the formation of resin images is achieved on the image-bearing member.

Figure 7A:
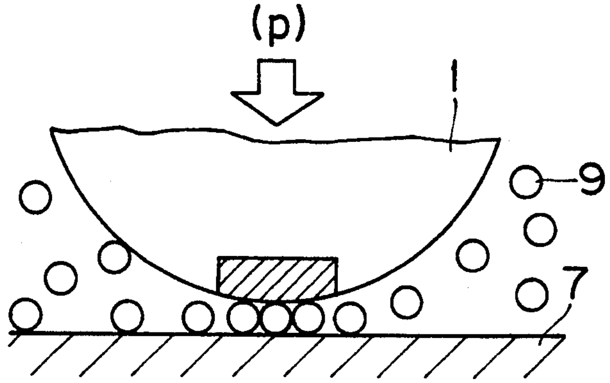
FIGS. 7(*a*) and 7(*b*) are schematic cross-sectional views illustrating the formation of a resin image on the image-bearing member according to the image forming method of the present invention.
Figure 7B:
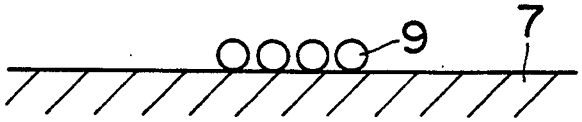

FIGS. 7(*a*) and 7(*b*) are schematic cross-sectional views illustrating how to form resin images on the image-bearing member according to the image forming method of the present invention. As shown in FIG. 7(*a*), heat is selectively applied to an image-bearing member 7 or an image-forming liquid by use of a heat-application means such as a thermal head 1 in accordance with signals corresponding to an image to be formed, and a pressure is also applied thereto in the direction of the arrow (P) by the thermal head 1, with the recording surface of the image-bearing member 7 being in contact with the image-forming liquid comprising finely-divided resin particles 9 dispersed therein. As a result, the finely-divided resin particles 9 in the image-forming liquid are deposited imagewise on the surface of the image-bearing member 7, as shown in FIG. 7(*b*). Thus, a latent resin image is formed on the image-bearing member 7. An image forming apparatus for the above-mentioned image forming method of the present invention can be prepared at a low cost.

The image-forming liquid for use in the present invention may further comprise a coloring material. More specifically, the coloring material may be dissolved or dispersed in the dispersion medium of the image-forming liquid, or the finely-divided resin particles may further comprise the coloring material. In this case, the formation of resin images and the development thereof can be simultaneously carried out. More specifically, colored resin images can be formed on the image-bearing member at a time, and the visible resin images thus obtained on the image-bearing member may be transferred to a recording sheet.

The image forming method of the present invention is applicable to an image-transfer type printer, direct-recording type printer, a printing press, memory device, and a display device.

When the image forming method of the present invention is applied to the printer, resin images formed on the image-bearing member may be transferred to a recording medium such as a sheet of paper according to the indirect recording system. Alternatively, according to the direct recording system, colored resin images may be formed on the image-bearing member serving as a recording medium capable of repelling the dispersion medium of the image-forming liquid.

The image forming method of the present invention can be utilized in the printing press in such a manner that development and image-transfer are repeated by using resin images formed on the surface of the image-bearing member as a print master.

Furthermore, the image forming method of the present invention can be used for the memory device by utilizing the information whether a resin image is present or not on the image-bearing member. In this case, the image-forming liquid may contain the coloring material, or not. Even if the image-forming liquid does not comprise the coloring material, the information can be read by detecting the difference between the reflectance of the resin image portion and that of the image-bearing member.

When the image forming method of the present invention is applied to the display device, the image forming apparatus may be designed in such a fashion that the resin images formed on the image-bearing member can be seen from the outside by, for instance, providing a window on the apparatus.

The image forming method according to the present invention and the apparatus therefor will now be explained in detail by referring to the Figures.

Figure 1:
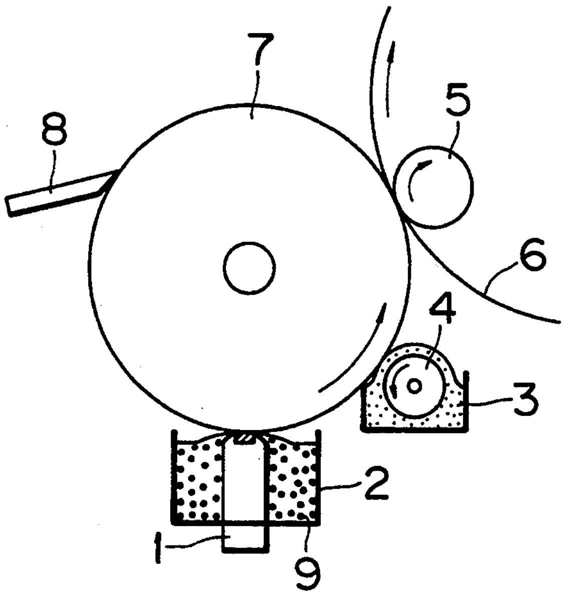
FIG. 1 is a schematic view showing an embodiment for carrying out the image forming method according to the present invention.

FIG. 1 is a schematic cross-sectional view showing one embodiment of an image forming apparatus of the present invention. In FIG. 1, reference numeral 1 indicates a thermal head serving as a heat-application means, having a head surface on which minute heating elements are arranged perpendicularly to this Figure; reference numeral 2, an image-forming liquid in which finely-divided resin particles 9 are dispersed in a dispersion medium; reference numeral 3, an ink for development in which a coloring material is dispersed or dissolved in a liquid; reference numeral 4, a development roller; reference numeral 5, a transfer roller; reference numeral 6, a recording sheet; reference numeral 7, a drum-shaped image-bearing member; and reference numeral 8, a cleaning member for the image-bearing member 7.

Figure 2A:
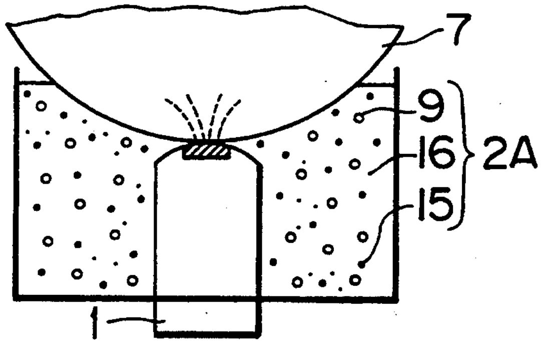
FIGS. 2(*a*) and 2(*b*) are schematic views in explanation of the image formation by use of an image-forming liquid comprising a coloring material.
Figure 2B:
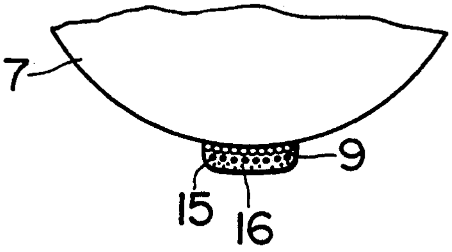

Instead of the image-forming liquid 2 used in the embodiment of FIG. 1, an image-forming liquid 2A may be used in the present invention, as shown in FIG. 2(*a*), which comprises a dispersion medium 16, and finely-divided resin particles 9 and a coloring material 15 which are dispersed in the dispersion medium 16. When this type of image-forming liquid 2A is used for forming images on the image-bearing member 7, a colored resin image can be formed thereon, as shown in FIG. 2(*b*).

When the surface of the image-bearing member 7 is heated by the thermal head 1, with being in contact with the image-forming liquid 2, as shown in FIG. 1, the finely-divided resin particles 9 in the image-forming liquid 2 are deposited on the surface of the image-bearing member 7. By the application of pressure in addition to heat, the adhesion of the finely-divided resin particles 9 to the image-bearing member 7 can be further stabilized, and the bond strength of the resin particles 9 to the image-bearing member 7 can be increased, and consequently, the resin particles 9 deposited on the image-bearing member 7 have improved resistance to scratching and abrasion.

Figure 3:
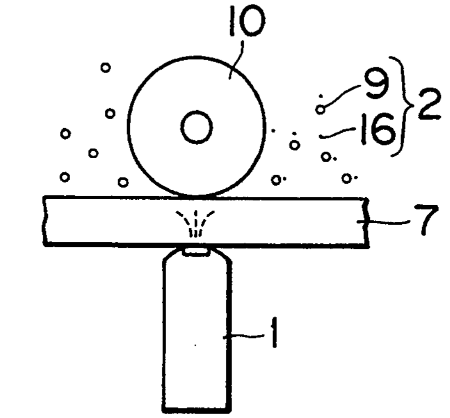
FIGS. 3 and 4 are partial schematic views showing embodiments for carrying out the image forming method according to the present invention.

When a film-shaped image-bearing member is used instead of the drum-shaped image-bearing member 7, the heat-application means such as a thermal head 1 may be located in such a configuration as shown in FIG. 3.

In FIG. 3, a film-shaped image-bearing member 7 is heated by a thermal head 1 from the opposite side to an image-forming liquid 2 with respect to the image-bearing member 7, and a pressure-application roller 10 is situated on the side of the image-forming liquid 2 so as to bring the image-bearing member 7 into pressure contact with the thermal head 1.

Figure 4:
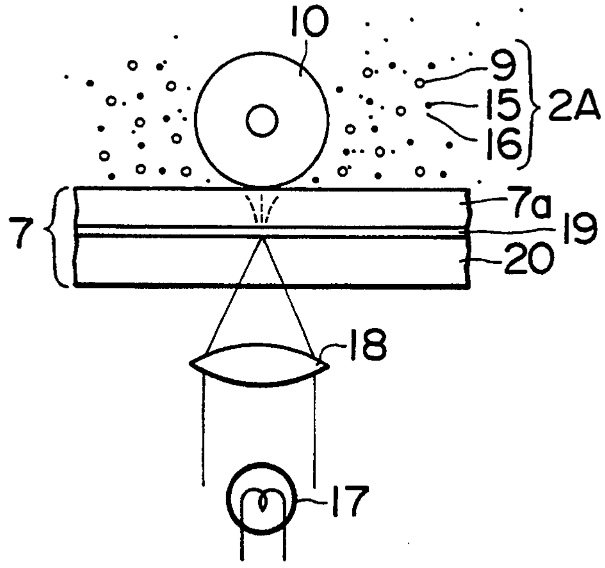

As shown in FIG. 4, the thermal energy may be applied to an image-bearing member 7 by the heat-application means such as an infrared heating source 17 from the opposite side to an image-forming liquid 2A with respect to the image-bearing member 7. In this embodiment, the image-bearing member 7 comprises an image-bearing film 7*a*, and an infrared absorbing material 19. When the handling of the image-bearing film 7*a* is inconvenient because it is too thin, the infrared absorbing material 19 and the image-bearing film 7*a* may successively be overlaid on a base film 20 capable of transmitting the infrared rays therethrough. In FIG. 4, reference numeral 18 indicates a lens.

In FIG. 1, the finely-divided resin particles 9 in the image-forming liquid 2 are deposited imagewise on the surface of the image-bearing member 7, thereby forming latent resin images thereon. After the formation of the latent resin images, the ink for development 3 is supplied to the latent resin images by the development roller 4, so that the latent resin images are developed into visible ink images. The ink images thus obtained are transferred to the recording sheet 6. When the image-forming liquid 2A, as explained in FIG. 2(*a*), comprising the coloring material 15 dispersed in the dispersion medium 16, or an image-forming liquid 2B comprising a coloring material which is contained in the finely-divided resin particles, is employed for the image formation, the developing means can be omitted because the formation of the resin images and the development thereof can simultaneously be carried out.

To obtain a plurality of copied materials from the same original image by using the image forming apparatus as shown in FIG. 1, the thermal head 1 may be detached from the surface of the image-bearing member 7 after the latent resin images are formed on the image-bearing member 7. Then, the resin images may be developed into visible images with the ink 3 by repeatedly supplying the ink 3 to the resin images, and the ink images may be transferred to a plurality of the recording sheets 6. To successively produce another image, the previous resin images formed on the image-bearing member 7 may be removed therefrom by use of a cleaning member 8.

The constituents of the image forming apparatus according to the present invention, such as the image-forming liquid and the image-bearing member will now be explained in detail.

The image-forming liquid 2 comprises the dispersion medium 16, and the finely-divided resin particles 9 which are dispersed in the dispersion medium 16.

In the present invention, a water-soluble or oil-soluble dispersion medium may be employed.

The resin particles 9 which are not dissolved in the employed dispersion medium 16 may be selected for preparing the image-forming liquid 2. For example, acrylic resin, methacrylic resin, vinyl acetate resin, ethylene—vinyl acetate resin and silicone resin can be used for the water-soluble dispersion medium, while ethylene resin and styrene resin can be used for the oil-soluble dispersion medium. In addition, a dispersion stabilizer, a viscosity modifier, a preservative, or a surface active agent may be contained in the image-forming liquid 2.

It is desirable that each resin particle for use in the image-forming liquid 2 be about as large as, or smaller than the size of one dot of a picture element. Therefore, the preferable particle diameter of the resin particles is 0.01 to 10 μm, and colloidal resin particles are preferred in the present invention.

To increase the image forming speed, it is desirable that the image-forming liquid 2, 2A or 2B have a low viscosity. It is preferable that the viscosity of the image-forming liquid be not more than a few poise, and more preferably 100 cP or less.

A properly high concentration of the finely-divided resin particles 9 in the image-forming liquid 2 is desirable to uniformly deposit the resin particles 9 on the image-bearing member 7. It is preferable that the amount of the resin particles be 5 wt. % or more of the total weight of the image-forming liquid 2. When the concentration of the finely-divided resin particles 9 is increased, however, the viscosity of the image-forming liquid 2 is also increased. Therefore, the concentration of the resin particles may be controlled with the viscosity of the image-forming liquid maintained at a few poise, more preferably 100 cP or less. Furthermore, means for detecting or maintaining the concentration of the resin particles in the image-forming liquid may be provided to observe the change in concentration of the resin particles with time.

The image-bearing member 7 for use in the present invention is capable of repelling the dispersion medium of the image-forming liquid 2 and the ink for development 3. When the capability of repelling the dispersion medium of the image-forming liquid 2 and the development ink 3 is expressed in terms of a receding contact angle, it is preferable that the receding contact angle be 80° or more with respect to a dispersion medium or a development ink with a surface tension of 50 dyn/cm or more, and 20° or more with respect to a dispersion medium or a development ink with a surface tension of less than 50 dyn/cm. More practically, a material to which the dispersion medium for use in the image-forming liquid or the ink is not attached is suitable for the image-bearing member 7 for use in the present invention after the material is immersed in the dispersion medium or the ink and pulled up therefrom perpendicularly at a speed of 1 mm/s or more. For instance, a water-repellent material is preferable for the image-bearing member 7 when the ink for development is water-soluble; while an oil-repellent material is preferable when the ink is oil-soluble. It is preferable that the surface of the image-bearing member 7 comprise a silicone resin (or silicone rubber) and a fluororesin no matter whether the ink for development is water-soluble or oil-soluble.

Specific examples of the fluororesin for use in the image-bearing member 7 are shown in Table 1.

TABLE 1

| Type of Fluororesin | Structural Formula |
|---|---|
| Polytetrafluoroethylene (PTFE) | $-[CF_2CF_2]-_n$ |
| Tetrafluoroethylene-hexafluoropropylene copolymer (FEP) | $-[CF_2CF_2]-_m-[CF_2CF(CF_3)]-_n$ |
| Tetrafluoroethylene-perfluoroalkylvinyl ether copolymer (PFA) | $-[CF_2CF_2]-_m-[CF_2CF(OR_f)]-_n$ ($R_f$: perfluoroalkyl group) |
| Tetrafluoroethylene-ethylene copolymer (ETFE) | $-[CF_2CF_2]-_m-[CH_2CH_2]-_n$ |
| Polychlorotrifluoro-ethylene (PCTFE) | $-[CF_2CFCl]-_n$ |
| Polyvinylidene fluoride (PVdF) | $-[CH_2CF_2]-_n$ |
| Tetrafluoroethylene-hexafluoropropylene-perfluoroalkylvinyl ether copolymer (EPE) | $-[CF_2CF_2]-_l-[CF_2CF(CF_3)]-_m$ $-[CF_2CF(OR_f)]-_n$ ($R_f$: perfluoroalkyl group) |

Figure 5:
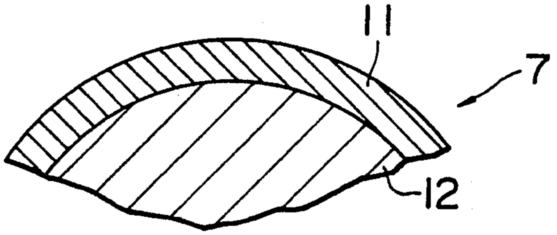
FIG. 5 is a cross-sectional broken view of a drum-shaped image-bearing member for use in the present invention.
Figure 6A:
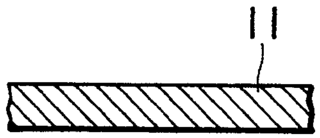
FIGS. 6(*a*) and 6(*b*) are cross-sectional broken views of a belt-shaped image-bearing member for use in the present invention.
Figure 6B:
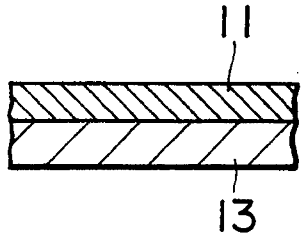

The image-bearing member 7 for use in the present invention may be a drum-shaped one as in FIG. 1, and a belt-shaped and film-shaped one as in FIG. 3 and FIG. 4. When the drum-shaped image-bearing member 7 is used, an image-bearing material 11 may be provided on a drum-shaped substrate 12 such as an aluminum cylinder as shown in FIG. 5. In the case of the belt-shaped image-bearing member 7, an image-bearing material 11 may be used by itself as the image-bearing member 7 as shown in FIG. 6(*a*), or the image-bearing material 11 may be provided on a belt-shaped substrate 13 as shown in FIG. 6(*b*).

The ink for development 3 may contain a dye or pigment. A water-soluble ink is used when the image-forming liquid 2 comprises hydrophilic resin particles, while an oil-soluble ink is used when the image-forming liquid 2 comprises lipophilic resin particles.

The cleaning member 8 in FIG. 1 is capable of removing the image-forming liquid 2, 2A or 2B from the image-bearing member 7 without damaging the surface of the image-bearing member 7. For example, a blade or roller made from rubber or sponge can be used as the cleaning member 8 in the present invention.

FIGS. 8 through 25 are schematic cross-sectional views showing embodiments of an image forming apparatus according to the present invention.

Figure 8:
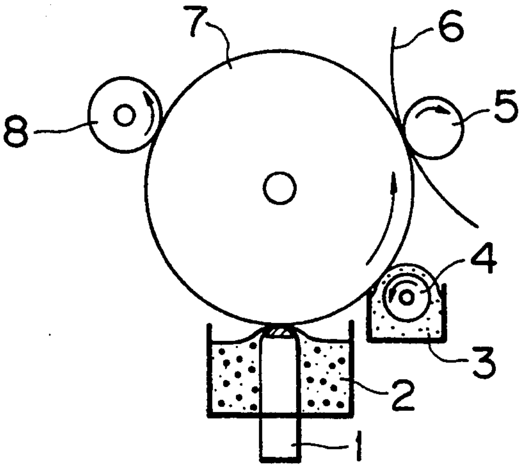
FIGS. 8 through 25 are schematic cross-sectional views showing embodiments of an image forming apparatus according to the present invention.

An image forming apparatus shown in FIG. 8 is the same as that in FIG. 1 except that a cleaning roller 8 comprising a porous material such as sponge is used instead of the cleaning blade as the cleaning member.

Figure 9:
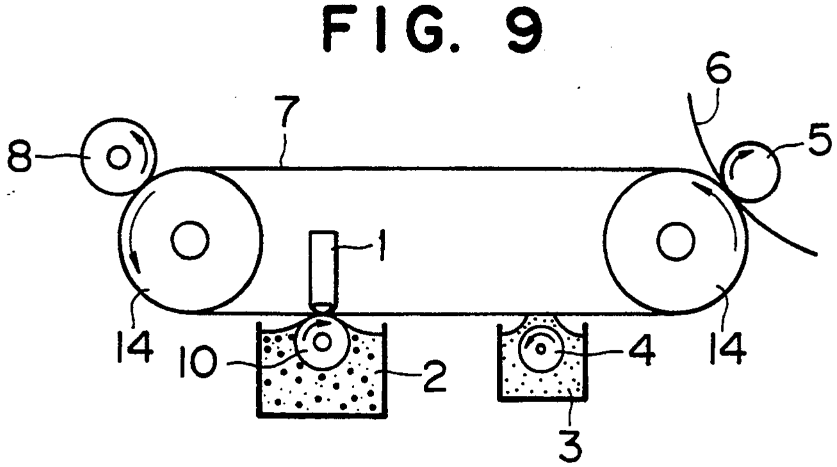

In FIG. 9, an endless-belt-shaped image-bearing member 7 is rotated by feeding rollers (or pulleys) 14. A pressure-contact-application roller 10 is provided on the side of an image-forming liquid 2 with respect to the image-bearing member 7. A thermal head 1 is situated on the opposite side to the image-forming liquid 2 with respect to the image-bearing member 7 so as to direct toward the pressure-contact-application roller 10 through the image-bearing member 7, and designed to apply heat to the image-bearing member 7 from the rear side thereof.

Figure 10:
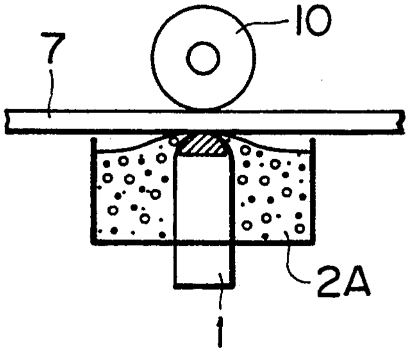

In FIG. 10, the position of a thermal head 1 and that of a pressure-contact-application roller 10 are reversed with respect to a belt-shaped image-bearing member 7, as compared with the embodiment shown in FIG. 9. Since the image-forming liquid 2A comprising a coloring material is used in FIG. 10, the development roller 4 and the ink for development 3 as employed in FIG. 9 can be omitted.

Figure 11:
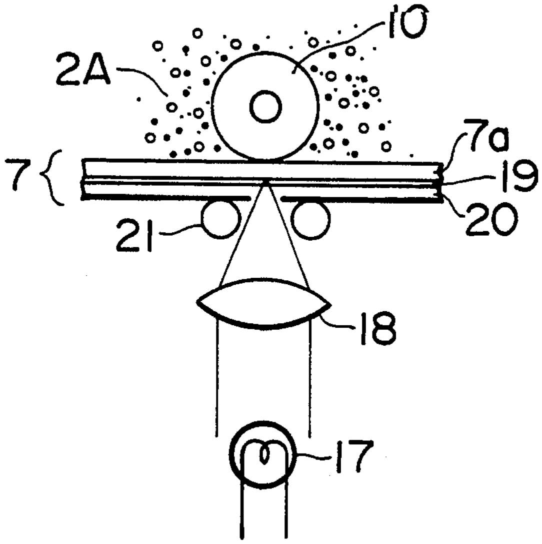

An image forming apparatus shown in FIG. 11 has almost the same structure as that in FIG. 4. In the image forming apparatus in FIG. 11, supporting rollers 21 are situated opposite to a pressure-contact-application roller 10 with respect to an image-bearing member 7. In this embodiment, therefore, not only the heat is applied to the image-bearing member 7 and an image-forming liquid 2A by use of an infrared heating source 17, but also the pressure can be applied thereto by using the pressure-contact-application roller 10.

Figure 12:
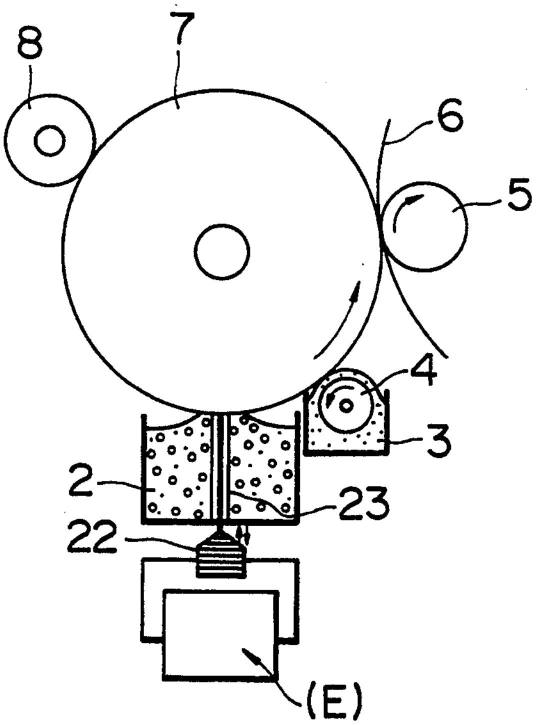

An image forming apparatus shown in FIG. 12 employs pressure-application means instead of the heat-application means as employed in the image forming apparatus shown in FIG. 8 in order to deposit finely-divided resin particles in an image-forming liquid 2 on the recording surface of a drum-shaped image-bearing member 7. An energy-supplying-source (E) supplies some energy to a driving part 22 comprising piezoelectric elements in accordance with image signals to drive a pressure-application part 23 in which pressure-application minute elements are arranged. The finely-divided resin particles in the image-forming liquid 2 are deposited on the surface of the image-bearing member 7 with the application of pressure thereto.

Figure 13:
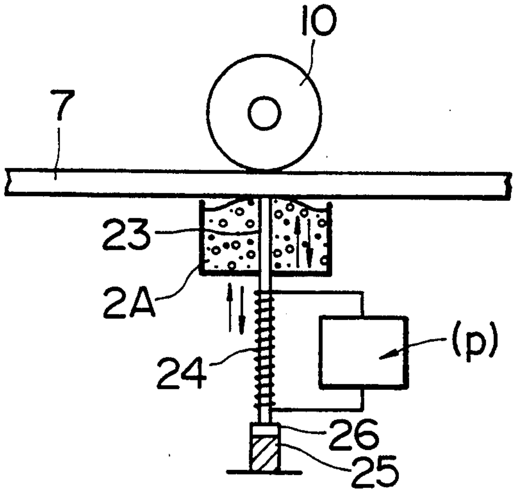

An image forming apparatus shown in FIG. 13 employs pressure-application means instead of the heat-application means such as a thermal head as used in FIG. 10 in order to deposit finely-divided resin particles in an image-forming liquid 2A on the surface of a belt-shaped image-bearing member 7. Pressure-application minute elements are arranged in a pressure-application part 23, each element being driven by a driving part which comprises a solenoid 24, a spring 25 and a ferromagnetic substance 26. In this embodiment, a power source (P) for the solenoid 24 is controlled in accordance with the image signals to drive the pressure-application part 23. Since the image-forming liquid 2A comprises finely-divided resin particles and a coloring material, the resin particles to which the coloring material is attached are deposited on the surface of the image-bearing member 7. Namely, the formation of the resin images and the development thereof are simultaneously carried out.

Figure 14:
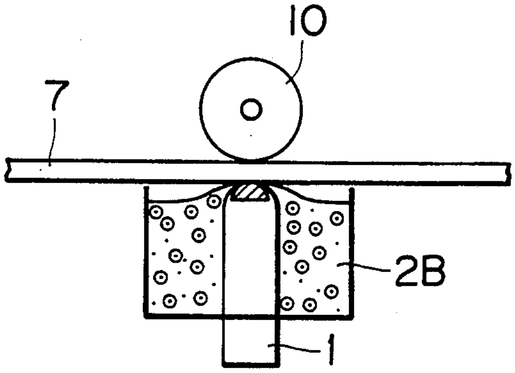

The structure of an image-forming apparatus shown in FIG. 14 is the same as that in FIG. 10. In this embodiment, the image-forming liquid 2A used in the image forming apparatus of FIG. 10 is replaced by an image-forming liquid 2B comprising a dispersion medium, and coloring-material-containing finely-divided resin particles which are dispersed in the dispersion medium.

Figure 15:
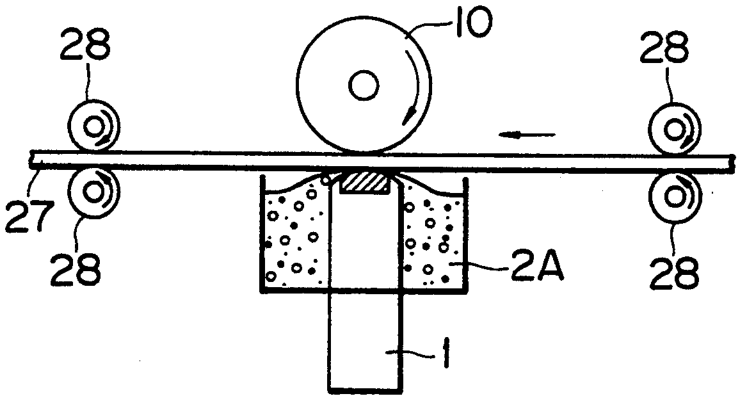

FIG. 15 illustrates an embodiment of the direct printing system using a recording medium 27 such as an OHP film or a sheet of recording paper as the image-bearing member. The recording medium 27 is transported by recording-medium-feeding rollers 28. An image-forming liquid 2A for use in this embodiment comprises a dispersion medium, a coloring material dissolved or dispersed in the dispersion medium, and finely-divided resin particles dispersed in the dispersion medium. A thermal head 1 is heated in accordance with the signals corresponding to an image to be formed, and colored resin images are deposited imagewise on the recording surface of the recording medium 27 by the application of heat and pressure thereto, thereby directly obtaining visible images on the recording medium 27.

Figure 16:
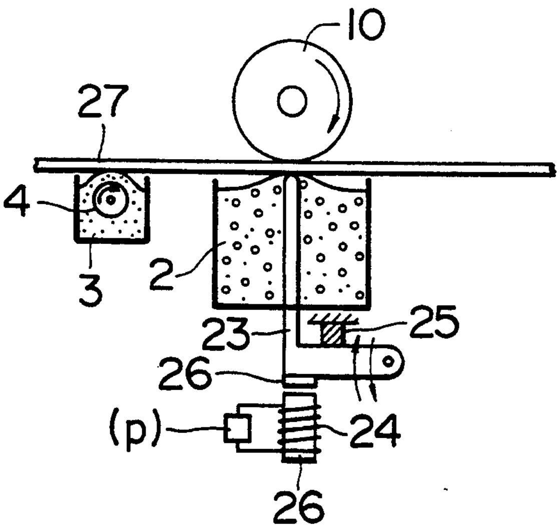

FIG. 16 illustrates another embodiment of the direct printing system using a recording medium 27 such as an OHP film or a sheet of recording paper as the image-bearing member. A pressure-application part 23 serving as pressure-application means is driven in accordance with the signals corresponding to an image to be formed, and applies pressure to an image-forming liquid 2. Thus, finely-divided resin particles in the image-forming liquid 2 are deposited imagewise on the surface of the recording medium 27, thereby obtaining latent resin images on the recording medium 27. Thereafter, the latent resin images are developed into visible images with an ink for development 3.

Figure 17:
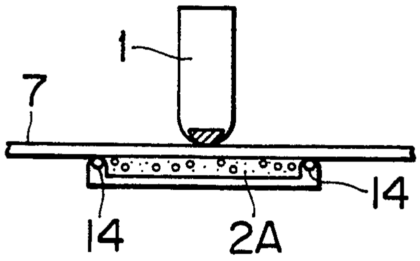

In an image forming apparatus shown in FIG. 17, a container for an image-forming liquid 2A is made shallow to decrease the loss of thermal energy supplied by a thermal head 1, and feeding rollers 14 for an image-bearing member 7 are provided on the top of the aforementioned container.

Figure 18:
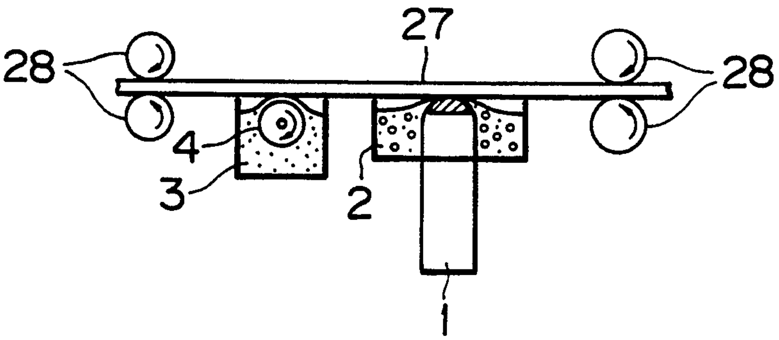

FIG. 18 illustrates a further embodiment of the direct printing system using a recording medium 27 such as an OHP film or a sheet of recording paper as the image-bearing member. The recording medium 27 is transported by recording-medium-feeding rollers 28A. A thermal head 1 is heated in accordance with the signals corresponding to an image to be formed, and finely-divided resin particles in an image-forming liquid 2 are deposited imagewise on the surface of the recording medium 27 by the application of heat thereto, thereby obtaining latent resin images on the recording medium 27. Thereafter, the resin images on the recording medium 27 are developed into visible ink images with an ink 3 supplied by a development roller 4.

Figure 19:
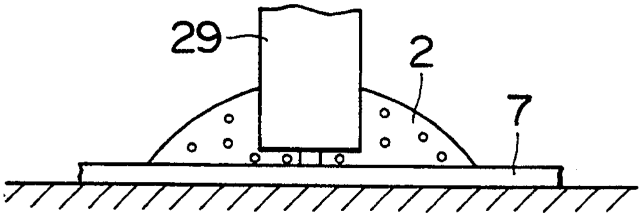

In FIG. 19, finely-divided resin particles in an image-forming liquid 2 are deposited on the surface of an image-bearing member 7 by the application of heat and pressure thereto using a rod-type heat- and pressure-application means 29.

Figure 20:
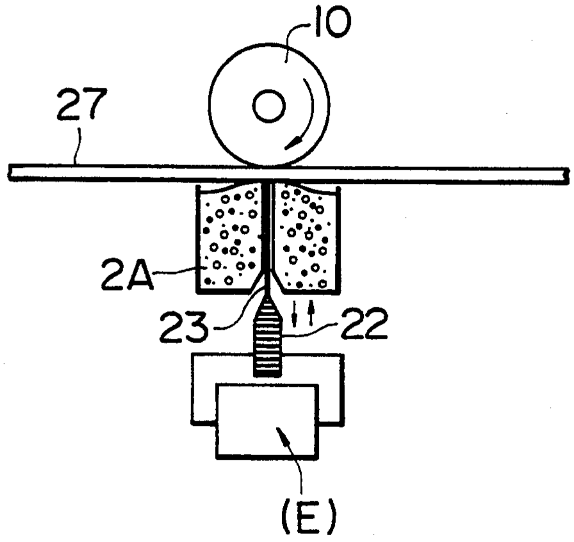

FIG. 20 illustrates a further embodiment of the direct printing system using a recording medium 27 such as an OHP film or a sheet of recording paper as the image-bearing member. In this embodiment, the same pressure-application means as used in FIG. 12 is employed. In addition, an image-forming liquid 2A comprising a coloring material is employed, so that the formation of the resin images and the development thereof are simultaneously carried out on the recording medium 27.

Figure 21:
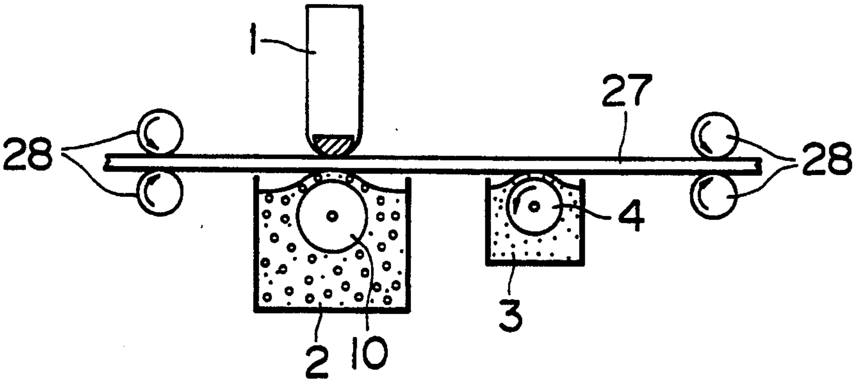

FIG. 21 illustrates a further embodiment of the direct printing system using a recording medium 27 such as an OHP film or a sheet of recording paper as the image-bearing member. In this embodiment, a thermal head 1 and a pressure-contact-application roller 10 are positioned in such a configuration that they are directed to each other through the recording medium 27. Therefore, by the application of both of heat and pressure to the recording medium 27 by use of the thermal head 1 and the pressure-contact-application roller 10, the finely-divided resin particles in the image-forming liquid 2 are deposited imagewise on the surface of the recording medium 27. Thereafter, the obtained latent resin images are developed into visible images with an ink for development 3.

The present invention will now be explained in detail with reference to the following examples of the image forming apparatus of the present invention with such a structure as shown in FIGS. 8 through 21.

EXAMPLE 1

Using the following constituents, the image forming apparatus with a structure as shown in FIG. 12 was prepared:

(Image-forming liquid 2): a colloidal dispersion of fluorine-containing acrylate (Trademark "EX-125", made by NOK KLÜBER) with a solid content of 15 wt. %.

(Ink for development 3): a water-soluble dye-containing ink, comprising 7 wt. % of a direct dye represented by the following formula, 2 wt. % of ethylene glycol and 91 wt. % of water:

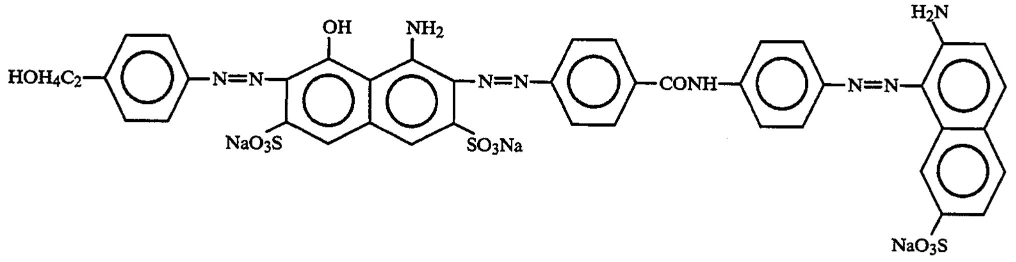

(Image-bearing member 7): comprising a silicone rubber.

(Cleaning member 8): comprising a porous material, "Rubysheet" (Trademark), made by Toyo Polymer Co., Ltd., with a mean pore opening of about 10 μm.

Using the image forming apparatus thus prepared, a pressure-application part 23 was driven in accordance with the signals corresponding to an image to be formed to apply a pressure of about 10 g/dot at room temperature (about 25° C.) to the image-bearing member 7, so that the finely-divided resin particles in the image-forming liquid 2 were deposited imagewise on the surface of the image-bearing member 7 with a recording density of 180 dpi. Thus, latent resin images were formed on the image-bearing member 7. Then, the latent resin images were developed into visible ink images with the ink for development 3, and the ink images were transferred to a recording sheet 6. The images transferred to the recording sheet 6 were excellent.

EXAMPLE 2

The image-forming apparatus with a structure as shown in FIG. 8 was prepared using the same image-forming liquid 2, ink for development 3, image-bearing member 7 and cleaning member 8 as those employed in Example 1.

The finely-divided resin particles in the image-forming liquid 2 were deposited imagewise on the surface of the image-bearing member 7 with the application of heat thereto by use of a thermal head 1, which was heated to about 120° C. in accordance with the signals corresponding to an image to be formed. In the course of the deposition of the resin particles, a pressure of about 320 g/cm on one alignment of heating elements of the thermal head 1 was also applied to the image-bearing member 7 through the thermal head 1. Thus, latent resin images were formed on the image-bearing member 7. Then, the latent resin images were developed into visible ink images with the ink for development 3, and the ink images were transferred to a recording sheet 6. The images transferred to the recording sheet 6 were excellent.

EXAMPLE 3

Using the following constituents, the image forming apparatus with a structure as shown in FIG. 12 was prepared:

(Image-forming liquid 2): a colloidal dispersion of vinyl acetate—ethylene (Trademark "S-753", made by Sumitomo Chemical Co., Ltd.) with a solid content of 15 wt. %.

(Ink for development 3): the same as that employed in Example 1.

(Image-bearing member 7): comprising a commercially available fluororesin, "Teflon" (Trademark).

(Cleaning member 8): the same as that employed in Example 1.

Using the image forming apparatus thus prepared, a pressure-application part 23 was driven in accordance with the signals corresponding to an image to be formed to apply a pressure of about 10 g/dot at room temperature (about 25° C.) to the image-bearing member 7, so that the finely-divided resin particles in the image-forming liquid 2 were deposited imagewise on the surface of the image-bearing member 7 with a recording density of 180 dpi. Thus, latent resin images were formed on the image-bearing member 7. Then, the latent resin images were developed into visible ink images with the ink for development 3, and the ink images were transferred to a recording sheet 6. The images transferred to the recording sheet 6 were excellent.

EXAMPLE 4

The image-forming apparatus with a structure as shown in FIG. 9 was prepared using the same image-forming liquid 2, ink for development 3, image-bearing member 7 and cleaning member 8 as those employed in Example 3.

The finely-divided resin particles in the image-forming liquid 2 were deposited imagewise on the surface of the image-bearing member 7 with the application of heat thereto by use of a thermal head 1, which was heated to about 120° C. in accordance with the signals corresponding to an image to be formed. In the course of the deposition of the resin particles, a pressure of about 320 g/cm on one alignment of heating elements of the thermal head 1 was also applied to the image-bearing member 7 through the thermal head 1. Thus, latent resin images were formed on the image-bearing member 7. Then, the latent resin images were developed into visible ink images with the ink for development 3, and the ink images were transferred to a recording sheet 6. The images transferred to the recording sheet 6 were excellent.

EXAMPLE 5

Using the following constituents, the image forming apparatus with a structure as shown in FIG. 13 was prepared:
(Image-forming liquid 2A): comprising the following components:

| | Wt. % |
|---|---|
| Vinyl acetate/ethylene/acryl (Trademark "S-920", made by Sumitomo Chemical Co., Ltd.) | 60 |
| Dye (C.I. Direct Black 168) | 10 |
| Ethylene glycol | 20 |
| Water | 10 |

(Image-bearing member 7): comprising a commercially available fluororesin "Teflon" (Trademark).
(Cleaning member 8): the same as that employed in Example 1.
(Pressure-contact-application roller 10): comprising a silicone rubber.

Using the image forming apparatus thus prepared, a pressure-application part 23 was driven in accordance with the signals corresponding to an image to be formed to apply a pressure of about 10 g/dot at room temperature (about 25° C.) to the image-bearing member 7, so that the finely-divided resin particles in the image-forming liquid 2A were deposited imagewise on the surface of the image-bearing member 7 with a recording density of 180 dpi. Thus, colored resin images were formed on the image-bearing member 7. Then, the colored resin images were transferred to a recording sheet 6. The images transferred to the recording sheet 6 were excellent.

EXAMPLE 6

The image-forming apparatus with a structure as shown in FIG. 10 was prepared using the same image-forming liquid 2A, image-bearing member 7, cleaning member 8 and pressure-contact-application roller 10 as those employed in Example 5.

The finely-divided resin particles in the image-forming liquid 2A were deposited imagewise on the surface of the image-bearing member 7 with the application of heat thereto by use of a thermal head 1, which was heated to about 120° C. in accordance with the signals corresponding to an image to be formed. In the course of the deposition of the resin particles, a pressure of about 320 g/cm on one alignment of heating elements of the thermal head 1 was also applied to the image-bearing member 7 through the thermal head 1. Thus, colored resin images were formed on the image-bearing member 7. Then, the colored resin images were transferred to a recording sheet 6. The images transferred to the recording sheet 6 were excellent.

EXAMPLE 7

Using the following constituents, the image forming apparatus with a structure as shown in FIG. 13 was prepared:
(Image-forming liquid 2A): comprising the following components:

| | Wt. % |
|---|---|
| Silicone resin (Trademark "SE-1980Clear", made by Dow Corning Toray Silicone Co., Ltd.) | 30 |
| Dye (C.I. Direct Black 168) | 10 |
| Ethylene glycol | 20 |
| Water | 40 |

(Image-bearing member 7): comprising a silicone rubber.
(Cleaning member 8): the same as that employed in Example 1.
(Pressure-contact-application roller 10): comprising a silicone rubber.

Using the image forming apparatus thus prepared, a pressure-application part 23 was driven in accordance with the signals corresponding to an image to be formed to apply a pressure of about 10 g/dot at room temperature (about 25° C.) to the image-bearing member 7, so that the finely-divided resin particles in the image-forming liquid 2A were deposited imagewise on the surface of the image-bearing member 7 with a recording density of 180 dpi. Thus, colored resin images were formed on the image-bearing member 7. Then, the colored resin images were transferred to a recording sheet 6. The images transferred to the recording sheet 6 were excellent.

EXAMPLE 8

The image-forming apparatus with a structure as shown in FIG. 11 was prepared using the same image-forming liquid 2A, image-bearing member 7, cleaning member 8 and pressure-contact-application roller 10 as those employed in Example 7.

The finely-divided resin particles in the image-forming liquid 2A were deposited imagewise on the surface of the image-bearing member 7 with the application of infrared laser beams thereto by use of an infrared heating source 17 in such a manner that an infrared absorbing portion in an infrared absorbing material 19 was heated to about 120° C. in accordance with the signals corresponding to an image to be formed. In the course of the deposition of the resin particles, a pressure of about 320 g/cm on one line was also applied to the image-bearing member 7 by the pressure-contact-application roller 10. Thus, colored resin images were formed on the image-bearing member 7. Then, the colored resin images were transferred to a recording sheet 6. The images transferred to the recording sheet 6 were excellent.

EXAMPLE 9

Using the following constituents, the image forming apparatus with a structure as shown in FIG. 14 was prepared:
(Image-forming liquid 2B): comprising the following components:

| | Wt. % |
|---|---|
| Wet-type toner (carbon-black-containing polystyrene) | 70 |
| n-undecane | 30 |

(Image-bearing member 7): comprising tetrafluoroethylene—hexafluoropropylene copolymer (FEP).

(Cleaning member 8): the same as that employed in Example 1.

The finely-divided resin particles in the image-forming liquid 2B were deposited imagewise on the surface of the image-bearing member 7 with the application of heat thereto by use of a thermal head 1, which was heated to about 90° C. in accordance with the signals corresponding to an image to be formed. In the course of the deposition of the resin particles, a pressure of about 320 g/cm on one alignment of heating elements of the thermal head 1 was also applied to the image-bearing member 7 through the thermal head 1. Thus, colored resin images were formed on the image-bearing member 7. Then, the colored resin images were transferred to a recording sheet 6. The images transferred to the recording sheet 6 were excellent.

EXAMPLE 10

The image-forming apparatus with a structure as shown in FIG. 16 was prepared using the same image-forming liquid 2, and ink for development 3 as those employed in Example 1. In this image-forming apparatus, direct printing was carried out using a commercially available OHP film as a recording medium 27.

Using the image forming .apparatus thus prepared, a pressure-application part 23 was driven in accordance with the signals corresponding to an image to be formed to apply a pressure of about 10 g/dot (ψ200 μm) at room temperature to the recording medium 27. As a result, excellent resin images were directly formed on the recording medium 27.

EXAMPLE 11

The image-forming apparatus with a structure as shown in FIG. 21 was prepared using the same image-forming liquid 2, and ink for development 3 as those employed in Example 1. In this image-forming apparatus, direct printing was carried out using a commercially available OHP film as a recording medium 27.

The finely-divided resin particles in the image-forming liquid 2 were deposited imagewise on the surface of the recording medium 27 with the application of heat thereto by use of a thermal head 1, which was heated to about 120° C. in accordance with the signals corresponding to an image to be formed. In the course of the deposition of the resin particles, a pressure of about 320 g/cm on one alignment of heating elements of the thermal head 1 was also applied to the recording medium 27 through the thermal head 1. As a result, excellent resin images were directly formed on the recording medium 27.

EXAMPLE 12

The image-forming apparatus with a structure as shown in FIG. 20 was prepared using the same image-forming liquid 2A comprising the coloring material as that employed in Example 5. In this image-forming apparatus, direct printing was carried out using a commercially available OHP film as a recording medium 27.

Using the image forming apparatus thus prepared, a pressure-application part 23 was driven in accordance with the signals corresponding to an image to be formed to apply a pressure of about 10 g/dot (104 200 μm) at room temperature to the recording medium 27. As a result, excellent colored resin images were directly formed on the recording medium 27.

EXAMPLE 13

The image-forming apparatus with a structure as shown in FIG. 15 was prepared using the same image-forming liquid 2A comprising the coloring material as that employed in Example 5. In this image-forming apparatus, direct printing was carried out using a commercially available OHP film as a recording medium 27.

The finely-divided resin particles in the image-forming liquid 2A were deposited imagewise on the surface of the recording medium 27 with the application of heat thereto by use of a thermal head 1, which was heated to about 120° C. in accordance with the signals corresponding to an image to be formed. In the course of the deposition of the resin particles, a pressure of about 320 g/cm on one alignment of heating elements of the thermal head 1 was also applied to the recording medium 27 through the thermal head 1. As a result, excellent colored resin images were directly formed on the recording medium 27.

EXAMPLE 14

The image-forming apparatus with a structure as shown in FIG. 17 was prepared using the same image-forming liquid 2A comprising the coloring material and cleaning member 8 as those employed in Example 7. In this image-forming apparatus, an image-bearing member 7 comprising a commercially available fluororesin, "Teflon" (Trademark) was employed.

The finely-divided resin particles in the image-forming liquid 2A were deposited imagewise on the surface of the image-bearing member 7 with the application of heat thereto by use of a thermal head 1, which was heated to about 120° C. in accordance with the signals corresponding to an image to be formed. Thus, colored resin images were formed on the image-bearing member 7. Then, the colored resin images were transferred to a recording sheet 6. The images transferred to the recording sheet 6 were excellent.

EXAMPLE 15

The image-forming apparatus with a structure as shown in FIG. 18 was prepared using the same image-forming liquid 2 and ink for development 3 as those employed in Example 3. In this image-forming apparatus, direct printing was carried out using a commercially available OHP film as a recording medium 27.

The finely-divided resin particles in the image-forming liquid 2 were deposited imagewise on the surface of the recording medium 27 with the application of heat thereto by use of a thermal head 1, which was heated to about 120° C. in accordance with the signals corresponding to an image to be formed. As a result, excellent resin images were directly formed on the recording medium 27.

EXAMPLE 16

The image-forming apparatus with a structure as shown in FIG. 19 was prepared using the same image-forming liquid 2 as that employed in Example 1. In this image-forming apparatus, an image-bearing member 7 comprising a commercially available fluororesin "Teflon" (Trademark), and an aluminum rod 29 having a tip portion with a diameter of 2 mm which is in contact with the image-bearing member 7 was used as the heat- and pressure-application means.

When the aluminum rod 29 was heated to about 120° C. and applies a pressure of 200 g to the image-bearing member 7, the finely-divided resin particles in the image-forming liquid 2 were sufficiently deposited on the surface of the image-bearing member 7.

EXAMPLE 17

The image-forming apparatus with a structure as shown in FIG. 19 was prepared using the same image-forming liquid 2 as that employed in Example 3. In this image-forming apparatus, an image-bearing member 7 comprising a silicone rubber was employed, and an aluminum rod 29 having a tip portion with a diameter of 2 mm which is in contact with the image-bearing member 7 was used as the pressure-application means.

When a pressure of 1 kg was applied to the image-bearing member 7 by the aluminum rod 29, the finely-divided resin particles in the image-forming liquid 2 were sufficiently deposited on the surface of the image-bearing member 7.

As previously mentioned, the image formation is carried out using an image-forming liquid with a low viscosity according to the image forming method of the present invention. Therefore, the loss of the recording sheets can be minimized when the obtained images are transferred thereto, and high-speed image formation and recording can be achieved at a low cost.

In the previously mentioned image forming apparatuses as shown in FIGS. 1 and 8 according to the present invention, a head surface of the thermal head 1 and the image-bearing member 7 are relatively moved. To prevent the finely-divided resin particles deposited on the image-bearing member 7 from being rubbed by the head surface of the thermal head 1 and falling from the image-bearing member 7, some preferable embodiments of the image forming method and apparatus according to the present invention will now be described. The following embodiments of the image forming apparatus can prevent the resin particles deposited on the surface of the image-bearing member from being rubbed off from the image-bearing member by the thermal head, so that the resin particles deposited on an image area of the image-bearing member can be made even, thereby achieving satisfactory recording.

Figure 22A:
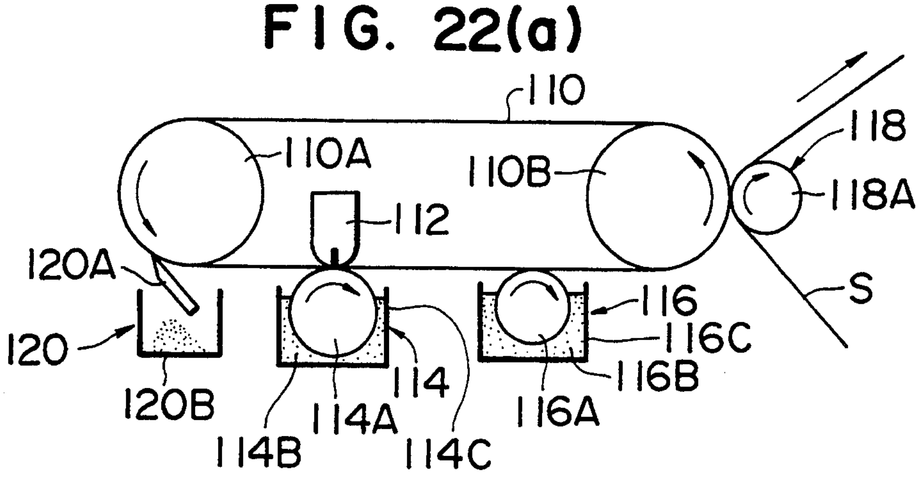
Figure 22B:
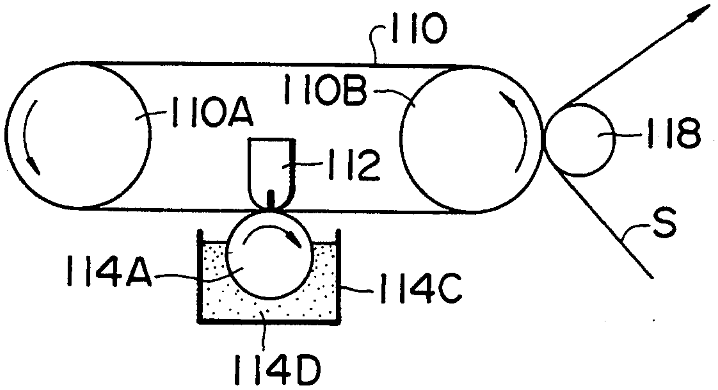

In an image forming apparatus of the present invention as shown in FIG. 22(*a*), an image-bearing member 110 in the form of an endless belt (hereinafter referred to as an image-bearing endless belt) is designed to rotate counterclockwise at a constant speed by image-bearing-endless-belt feeding pulleys 110A and 110B (hereinafter referred to as pulleys), with the pulley 110A driven to rotate by a driving means (not shown).

An image-forming-liquid supplying means 114 comprises an image-forming liquid 114B, a container 114C in which the image-forming liquid 114B is stored, and a supplying roller 114A by which the image-forming liquid 114B is supplied to the recording surface of the image-bearing endless belt 110. While the supplying roller 114A is turned clockwise around on its axis perpendicular to the Figure, the periphery of the supplying roller 114A is brought into contact with the surface of the image-bearing endless belt 110, thereby the image-forming liquid 114B can be supplied to the recording surface of the image-bearing endless belt 110. The supplying roller 114A is driven to rotate by a driving means (not shown) so as to make the peripheral moving speed of the supplying roller 114A equal to the moving speed of the image-bearing endless belt 110. The relative speed of the supplying roller 114A to the image-bearing endless belt 110, therefore, substantially stands at zero.

A developing means 116, situated at the right of the image-forming-liquid supplying means 114, comprises an ink for development 116B, a container 116C in which the ink 116B is stored, and an ink-supplying roller 116A by which the ink 116B is supplied to the recording surface of the image-bearing endless belt 110. While the ink-supplying roller 116A is turned in a predetermined direction around on its axis perpendicular to the Figure, the periphery of the ink-supplying roller 116A is brought into contact with the surface of the image-bearing endless belt 110, thereby the ink for development 116B can be supplied to the image-bearing endless belt 110. In this embodiment shown in FIG. 22(*a*), the ink-supplying roller 116A is designed to rotate clockwise, but the rotational direction and the rotational speed may be determined so as to carry out the development under the optimal conditions.

A thermal head 112 serves as a heat-application means for image formation. The thermal head 112 has a head surface on which minute heating elements are aligned in the direction perpendicular to the Figure. The head surface of the thermal head 112 is brought into pressure contact with the rear side of the image-bearing endless belt 110 in such a configuration that the thermal head 112 is directed to the supplying roller 114A over the image-bearing endless belt 110.

In addition, transferring means 118 comprises a transfer roller 118A capable of transporting an image-transfer sheet (S) in the direction of the arrow with the application of pressure toward the surface of the image-bearing endless belt 110, and means for driving the above-mentioned transfer roller 118A to rotate (not shown).

There is located means 120 for cleaning the surface of the image-bearing endless belt 110, which comprises a blade 120A for removing the resin particles deposited on the image-bearing endless belt 110, a container 120B in which the resin particles removed from the image-bearing endless belt 110 by the blade 120A are collected, and means for attaching the edge of the blade 120A to the surface of the image-bearing endless belt 110 and detaching the same therefrom (not shown).

When the process of image formation is initiated, the image-bearing endless belt 110 is driven to rotate, and the image-forming-liquid supplying means 114 and the developing means 116 come into operation. When the signals corresponding to an image to be formed are applied to the thermal head 112, the finely-divided resin particles in the image-forming liquid 114B supplied to the recording surface of the image-bearing endless belt 110, opposite to the thermal head 112 with respect to the belt 110, are selectively heated in accordance with the image signals, so that the finely-divided resin particles in the image-forming liquid 114B are deposited imagewise on the recording surface of the image-bearing endless belt 110. Thus, latent resin images are formed on the surface of the image-bearing endless belt 110.

Subsequently, the ink for development 116B supplied by the developing means 116 is selectively attached to the latent resin images, thereby developing latent resin images into visible ink images on the image-bearing endless belt 110. Then, the visible ink images are transferred to the image-transfer sheet (S) which is sent by the transfer roller 118A in the transferring means 118. The desired visible images can be thus obtained.

The latent resin images formed on the surface of the image-bearing endless belt 110 in accordance with the image signals can repeatedly be used. In the case where the same latent resin images are subjected to the repeated development and image transfer, the blade 120A in the cleaning means 120 is detached from the surface of the image-bearing endless belt 110, and at the same time, the image-forming-liquid supplying means 114 is also detached from the image-bearing endless belt 110. Thus, the development and the image transfer steps are repeated as required using the same latent resin images. After the ink images are transferred to the last image-transfer sheet (S), the cleaning means 120 is operated in such a manner that the edge of the blade 120A is attached to the surface of the image-bearing endless belt 110. The resin particles deposited on the image-bearing endless belt 110 are removed therefrom by the blade 120A and collected in the contained 120B, thereby terminating the process of image recording.

FIG. 22(*b*) is a schematic cross-sectional view showing another embodiment of an image forming apparatus of the present invention. This image forming apparatus shown in FIG. 22(*b*) is different from that in FIG. 22(*a*) in that the image-forming liquid 114B used in FIG. 22(*a*) is replaced by an image-forming liquid 114D comprising a coloring material. Therefore, the developing means is omitted in FIG. 22(*b*).

In this embodiment, when the image signals are applied to the thermal head 112, with the image-bearing endless belt 110 being rotated, the finely-divided resin particles in the image-forming liquid are selectively heated and the resin particles to which the coloring material is attached are deposited on the recording surface of the image-bearing endless belt 110, so that colored resin images can be formed on the surface of the image-bearing endless belt 110. By transferring the thus formed colored resin images to the image-transfer sheet (S), the desired recording images can be obtained. As a matter of course, the same cleaning means 120 as used in the apparatus shown in FIG. 22(*a*) can be provided in the image forming apparatus of FIG. 22(*b*).

Figure 23:
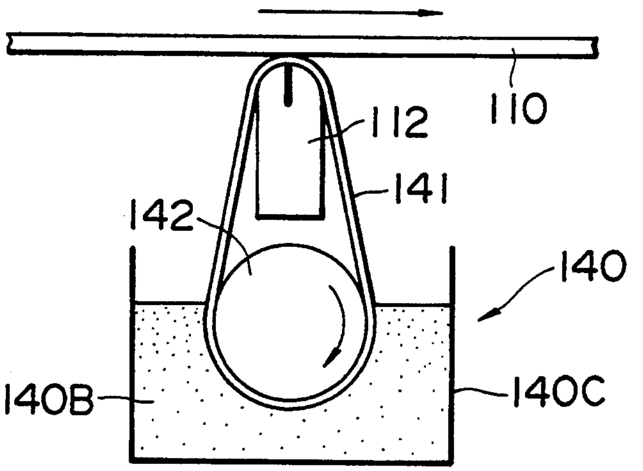

FIG. 23 is a partial cross-sectional view of an image forming apparatus of the present invention.

In this image forming apparatus shown in FIG. 23, an image-bearing member 110 in the form of an endless belt is moved in the direction of the arrow, and an image-forming-liquid supplying means 140 comprises an image-forming liquid 140B, which may comprise a coloring material or not, and a container 140C for storing the image-forming liquid 140B therein. In this embodiment, a thermal head 112 is situated on the side of the image-forming-liquid supplying means 140. A supplying endless belt 141 is passed around the thermal head 112 and a driving roller 142 in tension, and the thermal head 112 is positioned so as to bring the supplying endless belt 141 into pressure contact with the recording surface of the image-bearing member 110, as illustrated in FIG. 23. The driving roller 142 is designed to rotate the supplying endless belt 141 clockwise at a predetermined speed, that is, at the same speed as that of the image-bearing member 140. Since a part of the driving roller 142 is immersed in the image-forming liquid 140B stored in the container 140C, the image-forming liquid 140B is drawn up along the supplying endless belt 141 and supplied to the contact area between the supplying endless belt 141 and the recording surface of image-bearing member 110. The image-forming liquid 140B supplied to the above-mentioned contact area is selectively heated by the thermal head 112 across the supplying endless belt 141. In this case, the image-bearing member 110 may be in the form of an endless belt as shown in FIG. 23, or in the form of a drum or roller.

Figure 24:
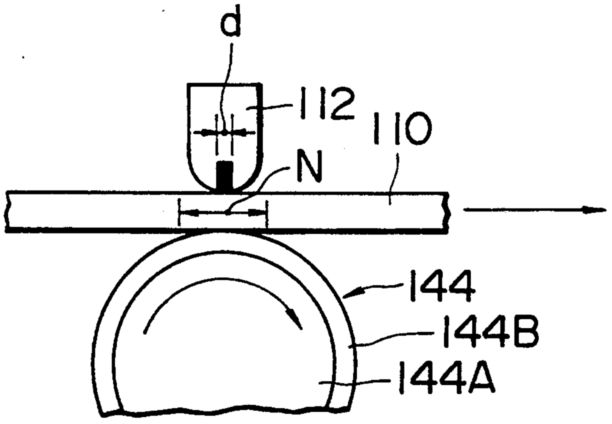

In an image forming apparatus shown in FIG. 24, a supplying roller 144 in an image-forming-liquid supplying means is brought into pressure contact with the recording surface of an image-bearing member 110. The supplying roller 144 comprises a rigid core roller 144A and an elastic layer 144B formed on the rigid core roller 144A. Due to the elastic deformation of the elastic layer 144B, a nip is produced at the position where the supplying roller 144 is in pressure contact with the image-bearing member 110, as shown in FIG. 24. A thermal head 112 is situated on the rear side of the image-bearing member 110, opposite to the image-forming-liquid supplying means with respect to the image-bearing member 110, and heating elements are aligned on the head surface of the thermal head 112 in the direction perpendicular to the Figure.

In this embodiment shown in FIG. 24, the nip width (N) is set larger than a width (d) of the alignment of the heating elements on the head surface of the thermal head 112. When one heating element of the thermal head 112 is heated in accordance with the signal corresponding to one dot of an image to be formed, an area slightly larger than the above-mentioned width (d) is substantially heated on the image-bearing member 110. When the rising-up and falling-down of heat developed, and the threshold value of the amount of the finely-divided resin particles deposited on the image-bearing member are taken into consideration, the size of one dot composed of the deposited resin particles is regarded as equivalent to the above-mentioned width (d). Since the nip width (N) is larger than the width (d) in this embodiment, as illustrated in FIG. 24, the resin particles can be surely deposited on the image-bearing member dot by dot, thereby achieving the excellent image formation.

Figure 25:
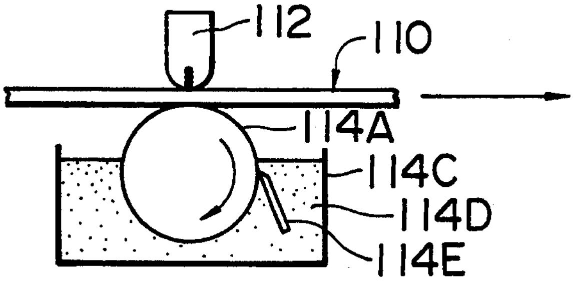

FIG. 25 is a partial cross-sectional view of an image forming apparatus of the present invention.

An image-forming liquid 114D in a container 114C, which may comprise a coloring material or not, is supplied to the recording surface of an image-bearing member 110 by a supplying roller 114A. In this embodiment, a cleaning blade 114E is provided so as to constantly touch the surface of the supplying roller 114A, so that the finely-divided resin particles in the image-forming liquid 114D which are fused and attached to the surface of the supplying roller 114A in the course of heating by a thermal head 112 can be removed from the supplying roller 114A. Therefore, this mechanism of the image forming apparatus as shown in FIG. 24 can solve the problem of the deposition of the resin particles on the background of the image-bearing member 110. When a supplying endless belt is used instead of the supplying roller, the cleaning blade 114E can be provided so as to touch the surface of the supplying endless belt.

The present invention will now be explained in detail with reference to the following examples of the image forming apparatus of the present invention with such a structure as shown in FIGS. 22 through 25.

EXAMPLE 18

Using the following constituents, the image forming apparatus with a structure as shown in FIG. 22(*a*) was prepared:

(Image-forming liquid 114B): a 20% colloidal dispersion of ethylene—vinyl acetate (Trademark "S-752", made by Sumitomo Chemical Co., Ltd.) with a colloidal particle diameter of a few micrometers, using water as a dispersion medium.

(Ink for development 116B): a water-soluble dye-containing ink prepared by dissolving 7 wt. % of the same direct dye as used in Example 1 and 20 wt. % of ethylene glycol in 73 wt. % of water.

(Image-bearing endless belt 110): Teflon film (Supplying roller 114A): stainless steel roller Using the image forming apparatus thus prepared, the latent resin images were formed on the image-bearing endless belt 110. The latent resin images were developed into visible ink images with the ink 116B, and the ink images were transferred to an image-transfer sheet (S). The images transferred to the image-transfer sheet (S) were excellent.

EXAMPLE 19

Using the following constituents, the image forming apparatus with a basic structure as shown in FIG. 22(*b*) was prepared:

(Image-bearing endless belt 110): silicone rubber film.

(Image-forming-liquid supplying means): replaced by one shown in FIG. 23, using a polyimide film as a supplying endless belt 141.

(Image-forming liquid 114D): prepared by dissolving 7 wt. % of the same direct dye as used in Example 1 in the same colloidal dispersion of ethylene—vinyl acetate as used in Example 18.

In this embodiment, a cleaning blade 114E comprising a silicone rubber as shown in FIG. 25 was provided so as to touch the surface of the supplying endless belt 141.

Using the image forming apparatus thus prepared, the colored resin images were formed on the recording surface of the image-bearing endless belt 110, and transferred to an image-transfer sheet (S). The images transferred to the image-transfer sheet (S) were excellent.

EXAMPLE 20

Using the following constituents, the image forming apparatus with a basic structure as shown in FIG. 22(*b*) was prepared:

(Image-forming liquid 114D): prepared by dispersing 20 wt. % of a commercially available fluorine-containing acrylate colloidal dispersion "EX-125" (Trademark), made by NOK KLÜBER, and dissolving 10 wt. % of the same direct dye as used in Example 1 and 20 wt. % of ethylene glycol in 50 wt %. of water.

(Image-bearing endless belt 110): Teflon film.

(Supplying roller 114A): stainless steel roller covered with a silicone rubber layer.

In this embodiment, a cleaning blade 114E comprising a silicone rubber as shown in FIG. 25 was provided so as to touch the surface of the supplying roller 114A.

Using the image forming apparatus thus prepared, the colored resin images were formed on the recording surface of the image-bearing endless belt 110, and transferred to an image-transfer sheet (S). The images transferred to the image-transfer sheet (S) were excellent.

In the image forming apparatuses of the present invention as shown in FIGS. 22 through 25, as previously explained, no mechanical force in the recording surface direction of the image-bearing member affects the resin particles deposited on the recording surface of the image-bearing member, so that the deposited resin images can be protected from mechanical friction. As a result, the quality of the recorded images can be improved.

In the aforementioned examples, the thermal head was employed as the heat-application means for carrying out the image formation, but an optical system using infrared laser beams is available. In this case, the image-bearing member, and the image-forming-liquid supplying means are made transparent, and the infrared laser beams may be applied to the image-forming liquid through the above-mentioned image-bearing member and the image-forming-liquid supplying means.

In the image forming method of the present invention, it is preferable to control the amount of the image-forming liquid supplied to the image-bearing member in order to obtain high quality images, especially in terms of gradation.

Figure 26:
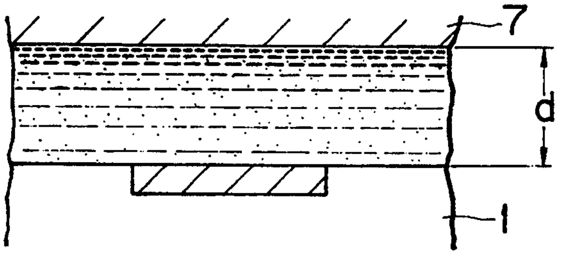
FIG. 26 is a schematic partial cross-sectional view showing an image-forming liquid layer formed between the image-bearing member and heat-application means in the image forming apparatus as shown in FIG. 1.

As illustrated in FIG. 26, the amount of the image-forming liquid supplied to image areas on the image-bearing member 7 varies depending upon the thickness of an image-forming liquid layer formed between the image-bearing member 7 and a thermal head 1, which is determined by a distance (d) between the surface of the image-bearing member 7 and the heat-application means such as a thermal head 1. When the amount of the image-forming liquid supplied to the image areas on the image-bearing member 7 is different, as a matter of course, the amount of the finely-divided resin particles contained in the image-forming liquid is also different, thereby causing the amount of the resin particles deposited on the image-bearing member 7 to vary.

Every image forming apparatus has a different distance (d) between the surface of the image-bearing member 7 and the heat-application means such as a thermal head 1 because of the dispersion of dimensional accuracy in assembling the apparatus, and the vibration applied to the apparatus during a long period of operation. In the same image forming apparatus, the distance (d) changes with the operating time. To produce high image quality constantly, therefore, the distance (d) plays an important part in the image forming apparatus of the present invention.

Figure 27A:
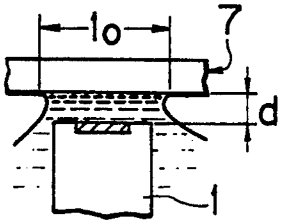
FIGS. 27(*a*) to 27(*c*) are schematic cross-sectional views explaining how to control the amount of the image-forming liquid retained on the recording surface of the image-bearing member.
Figure 27B:
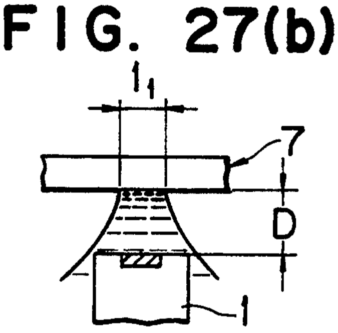
Figure 27C:
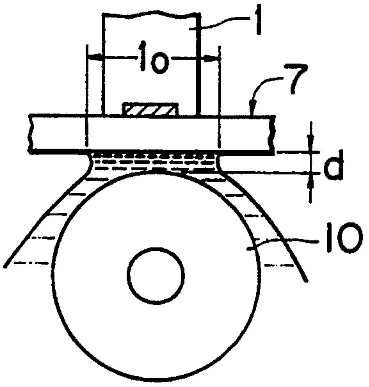

In FIG. 27(*a*), a distance (d) between the surface of an image-bearing member 7 and a thermal head 1 which is located on the side of the image-forming liquid is set at an optimal value in order to efficiently conduct the thermal energy supplied by the thermal head 1 to the image-forming liquid, and achieve the image formation by the application of a relatively small amount of the thermal energy.

In contrast to this, as shown in FIG. 27(*b*), a distance (D) between the surface of the image-bearing member 7 and the thermal head 1 is larger than the distance (d) in FIG. 27(*a*). When the distance between the surface of the image-bearing member 7 and the thermal head 1 is increased as shown in FIG. 27(*b*), a length ($l_0$) of the image-forming liquid layer which is in contact with the recording surface of the image-bearing member 7 in FIG. 27(*a*) is decreased to a length ($l_1$) as shown in FIG. 27(*b*). As a result, the amount of the image-forming liquid supplied to the recording surface of the image-bearing member 7 is decreased. When the worst comes to the worst, the image-forming liquid may not come in contact with the recording surface of the image-bearing member 7, and the recording surface of the image-bearing member 7 cannot be supplied with the image-forming liquid, so that image formation by causing the resin particles in the image-forming liquid to properly deposit on the recording surface of the image-bearing member 7 cannot be accomplished.

In FIG. 27(*c*), a thermal head 1 is situated on the rear side of an image-bearing member 7, opposite to an image-forming liquid with respect to the image-bearing member 7. The reliability of the image forming apparatus with such a structure is high because the head surface of the thermal head 1 is not in contact with the image-forming liquid, and consequently not stained with the image-forming liquid. In this case, an image-forming-liquid supplying means such as a roller 10 as shown in FIG. 27(*c*) or a belt for supplying the image-forming liquid to the image-bearing member 7 is provided on the side of the image-forming liquid. The image-forming liquid is introduced into the gap between the image-forming-liquid supplying means and the recording surface of the image-bearing member 7, thereby achieving the formation of images. In such a case as shown in FIG. 27(*c*), when the distance between the image-forming-liquid supplying means and the image-bearing member 7 becomes larger than the optimal distance (d) in FIG. 27(*c*), the optimal length ($l_0$) of the image-forming-liquid layer in contact with the image-bearing member 7 is decreased. Thus, the same problems as described in FIGS. 27(*a*) and 27(*b*) occur.

To surely deposit the resin particles in the image-forming liquid on the recording surface of the image-bearing member and produce high quality images, the image forming apparatus with the following structure, specifically, comprising means for controlling the thickness and length of a layer of the image-forming liquid supplied to image areas on the image-bearing member, is preferable in the present invention. In this kind of image forming apparatus, the thickness of the image-forming liquid layer is fixed, so that the length of the image-forming liquid layer in contact with the image-bearing member can be maintained constant. The contact area of the image-forming liquid with the image-bearing member is inevitably determined by the length of the image-forming liquid layer, and consequently, the amount of the image-forming liquid supplied to the images areas on the image-bearing member, which is obtained from the thickness of the image-forming liquid layer and the contact area thereof with the image-bearing member, can be maintained constant.

In the following embodiments of the present invention, the amount of the image-forming liquid supplied to the recording surface of the image-bearing member is controlled at the side of the image-forming-liquid supplying means or at the side of the image-bearing member.

According to the following embodiments, the thickness of the image-forming liquid layer at the position where the resin particles in the image-forming liquid are deposited on the image-bearing member, and/or the amount of the image-forming liquid retained on the image-bearing member can be maintained substantially constant, and at the same time, image areas obtained by depositing the resin particles on the recording surface of the image-bearing member can be prevented from becoming damaged because the image-forming liquid is present at least between the recording surface of the image-bearing member and the heat-application means.

Figure 28:
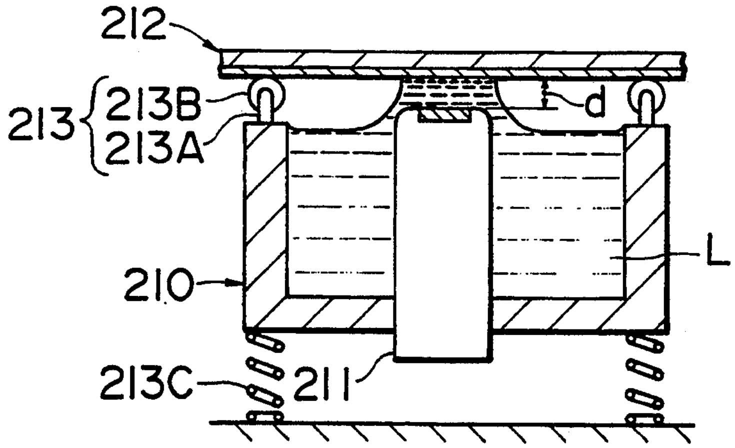
FIG. 28 is a schematic cross-sectional view showing an embodiment of an image forming apparatus according to the present invention which comprises means for controlling the amount of the image-forming liquid retained between the image-bearing member and the heat-application means.

In an image forming apparatus shown in FIG. 28, a thermal head 211 is located on the side of an image-forming liquid (L) with respect to an image-bearing member 212. The image-forming liquid (L) is stored in a container 210 and the thermal head 211 is integrated into the container in such a configuration that the head surface of the thermal head 221 is directed to the image-bearing member 212.

A means 213 for controlling the thickness and the length of the image-forming liquid layer retained between the head surface of the thermal head 211 and the recording surface of the image-bearing member 212 (hereinafter referred to as controlling means) is provided on the top of the container 210, as show in the Figure. In this embodiment, the controlling means 213 comprises supporting members 213A with a predetermined height, which are fixed on the top of the container 210, projecting toward the image-bearing member 212, and rollers 213B which are rotatably supported by the supporting members 213A and designed to come into contact with the recording surface of the image-bearing member 212. The rollers 213B are turned as the image-bearing member 212 moves so as not to resist the movement of the image-bearing member 212.

The container 210 is urged toward the image-bearing member 212 by means of springs 213C which is provided between the bottom of the container 210 and an immovable part of the image forming apparatus. Therefore, when the rollers 213B of the controlling means 213 come into contact with the surface of the image-bearing member 212, a distance (d) between the head surface of the thermal head 211 and the recording surface of the image-bearing member 212 can be controlled at a predetermined value. Since the rollers 213B are turned with the movement of the image-bearing member 212, the distance (d) can be maintained constant at any positions on the image-bearing member 212.

Examples of the material for the roller 213B include metals such as aluminum and stainless steel; resins such as fluororesin such as Teflon, and polycarbonate; and ceramics. The controlling means 213 may comprise an unrotatable member instead of the roller 213B, so long as the surface portion of the unrotatable member in contact with the image-bearing member 212 is sufficiently smooth.

In addition to the spring 213C, a driving system using air pressure, oil pressure, or solenoid may be used to bring the controlling means 213 into contact with the image-bearing member 212. Furthermore, the image-bearing member 212 may be urged toward the container 210, and more specifically, the image-bearing member 212 may be brought into contact with the controlling means 213 provided on the top of the container 210 by utilizing the weight of gravity of the image-bearing member 212.

Owing to the controlling means 213, the distance (d) between the head surface of the thermal head 211 and the recording surface of the image-bearing member 212 can always be kept constant, so that the thickness of the image-forming liquid layer formed between this gap can be fixed, and consequently, the length of the image-forming liquid layer in contact with the image-bearing member 212 can be maintained constant. As a result, the contact area of the image-forming liquid layer with the image-bearing member 212 can be controlled to the the predetermined value. Therefore, the amount of the image-forming liquid retained between the image-bearing member 212 and the thermal head 211 can be settled.

In the present invention, it is preferable to control the distance (d) between the head surface of the thermal head 211 and the recording surface of the image-bearing member 212 by means of the controlling means 213 so that the length of the image-forming liquid layer in contact with the image-bearing member 212 might be 1

μm to 5 mm, and more preferably 10 μm to 3 mm. When the amount of the image-forming liquid retained between the image-bearing member 212 and the thermal head 211 can be controlled in the above-mentioned manner, the amount of the finely-divided resin particles dispersed in the image-forming liquid is adequate to obtain resin images by depositing the resin particles on the image-bearing member 212. In addition to this, since the thickness of the image-forming liquid layer is appropriate, the thermal energy supplied from the thermal head 211 can be conducted through the image-forming liquid layer efficiently, which enables high speed image formation. The image-forming liquid is introduced into the aforementioned finely-adjusted gap between the thermal head 211 and the image-bearing member 212 by the capillary phenomenon, and retained in the gap, so that the recording surface of the image-bearing member 212 can be brought into contact with the image-forming liquid.

The present invention will now be explained in detail with reference to the following example of an image forming apparatus of the present invention comprising the above-mentioned controlling means.

EXAMPLE 21

Using the following constituents, the image forming apparatus with a basic structure as shown in FIG. 1 was prepared:

(Image-forming liquid 2): a 20% colloidal dispersion of ethylene—vinyl acetate (Trademark "S-752", made by Sumitomo Chemical Co., Ltd.)

(Ink for development 3): a water-soluble dye-containing ink prepared by dissolving 7 wt. % of the same direct dye as used in Example 1 and 2 wt. % of ethylene glycol in 91 wt. % of water.

(Image-bearing member 7): comprising a silicone rubber.

(Cleaning member 8): comprising a commercially available porous material, "Rubysheet" (Trademark), made by Toyo Polymer Co., Ltd., with a mean pore opening of about 10 μm.

In this embodiment, a part for forming latent resin images on the image-bearing member was designed in such a configuration as shown in FIG. 28, by providing means for controlling the distance (d) between the thermal head and the image-bearing member.

By use of the image forming apparatus thus prepared, latent resin images were formed on the recording surface of the image-bearing member by heating the thermal head to 150° C. in accordance with the signals corresponding to an image to be formed. The thus obtained latent resin images were developed into visible ink images with the ink. Then, excellent images were obtained by transferring the ink images to a recording sheet. In addition, the initial image was compared with the image obtained after the thermal head was heated 1000 times. When both images were separately transferred to recording sheets, the latter was as good as the former.

The above-mentioned controlling means 213 may not be provided on the container 210. For example, in FIG. 29, a distance-controlling member 230 is provided on the head surface of a thermal head 211. The distance-controlling member 230 serves to keep the gap between the head surface of the thermal head 211 and the recording surface of the image-bearing member 212, and at the same time, to allow the image-forming liquid to penetrate into the gap between the head surface of the thermal head 211 and the image-bearing member 212, thereby bringing the recording surface of the image-bearing member 212 into contact with the image-forming liquid.

Figure 30A:
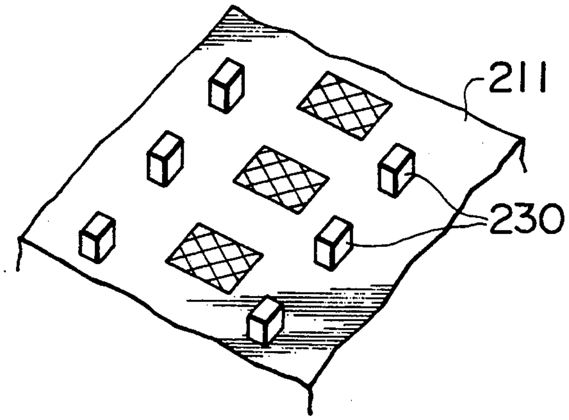
FIGS. 30(*a*) to 30(*c*) are perspective views showing three embodiments of the configuration of a member for controlling the amount of the image-forming liquid.
Figure 30B:
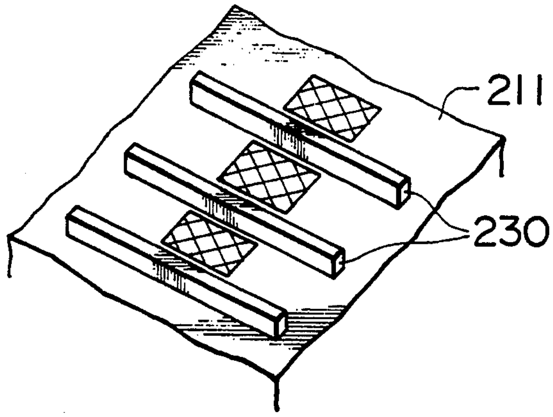
Figure 30C:
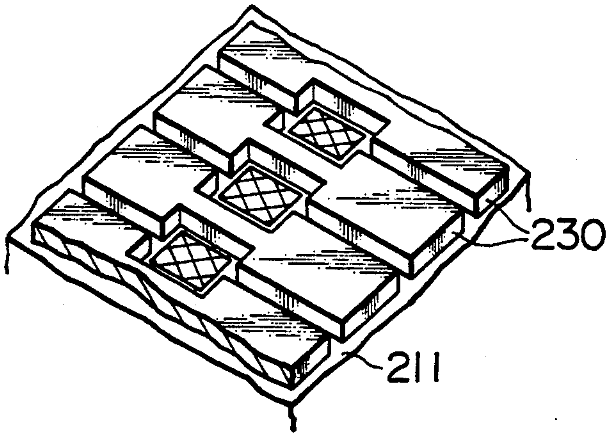

FIGS. 30(*a*) through 30(*c*) are partial perspective views of three embodiments illustrating the configuration of the head surface of the thermal head 211 and the distance-controlling members 230.

As shown in FIG. 30(*a*), a plurality of distance-controlling members 230 are aligned on both sides of the head surface of the thermal head 211, each distance-controlling member 230 projecting in the form of a column. In FIG. 30(*b*), each distance-controlling member 230 forms a wall between the adjoining heating elements, generating slits parallel to the distance-controlling members 230. In FIG. 30(*c*), the heating elements of the thermal head 211 are enclosed with distance-controlling members 230, generating slits around the heating elements. In FIGS. 30(*b*) and 30(*c*), the image-forming liquid can run through the above-mentioned slits by utilizing the moving force of the image-bearing member 212 because the image-bearing member 212 moves in the lengthwise direction of the slits obtained by the distance-controlling members 230 on the head surface of the thermal head 211. Furthermore, a plurality of heating elements are generally provided on the head surface of the thermal head 211 for increasing the recording speed. In particular, several hundreds of heating elements are mounted on the head surface of a line-type thermal head. To ensure the gap between the adjoining heating elements, the configuration as shown in FIG. 30(*b*) or 30(*c*) is regarded as advantageous. In addition, the image-forming liquid can be retained on every heating element by the capillary phenomenon, so that the recording surface of the image-bearing member 212 which is directed to the heating elements of the thermal head 211 can surely be brought into contact with the image-forming liquid.

Examples of the material for the distance-controlling member 230 are metal, glass, resin and ceramics. The surface of the distance-controlling member 230 is subjected to fine processing to obtain the dimensional accuracy.

The present invention will now be explained in detail with reference to the following example of an image forming apparatus of the present invention comprising the above-mentioned controlling means.

EXAMPLE 22

Using the following constituents, the image forming apparatus with a basic structure as shown in FIG. 1 was prepared:

(Image-forming liquid 2): a 20% colloidal dispersion of ethylene—vinyl acetate (Trademark "S-752", made by Sumitomo Chemical Co., Ltd.)

(Ink for development 3): a water-soluble dye-containing ink prepared by dissolving 7 wt. % of the same direct dye as used in Example 1 and 2 wt. % of ethylene glycol in 91 wt. % of water.

(Image-bearing member 7): comprising a silicone rubber.

(Cleaning member 8): comprising a commercially available porous material, "Rubysheet" (Trademark), made by Toyo Polymer Co., Ltd., with a mean pore opening of about 10 μm.

Figure 29:
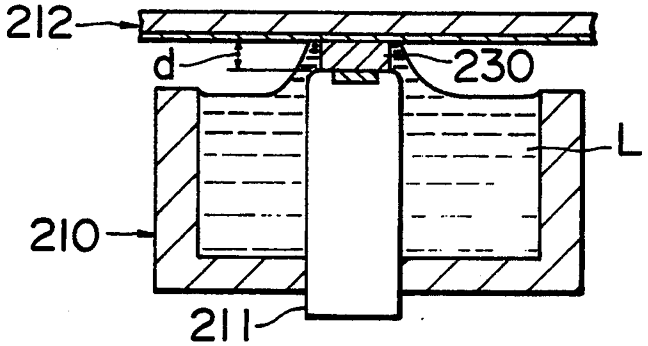
FIG. 29 is a schematic cross-sectional view showing another embodiment of an image forming apparatus according to the present invention which comprises means for controlling the amount of the image-forming liquid retained between the image-bearing member and the heat-application means.

In this embodiment, a part for forming latent resin images on the image-bearing member was designed as shown in FIG. 29, by providing distance-controlling members 230 with such a configuration as shown in FIG. 30(*b*) on the head surface of a thermal head.

By use of the image forming apparatus thus prepared, latent resin images were formed on the recording surface of the image-bearing member by heating the thermal head to 150° C. in accordance with the signals corresponding to an image to be formed. The thus obtained latent resin images were developed into visible ink images with the ink. Then, excellent images were obtained by transferring the ink images to a recording sheet. In addition, the initial image was compared with the image obtained after the thermal head was heated 1000 times. When both images were separately transferred to recording sheets, the latter was as good as the former.

In the present invention, the means for controlling the thickness and the length of the image-forming liquid layer retained between the thermal head and the image-bearing member can be provided in the image forming apparatus regardless of the shape of the image-bearing member. For instance, the controlling means is applicable to the image-bearing endless belt as well as the drum-shaped image-bearing member shown in FIG. 1.

Figure 31A:
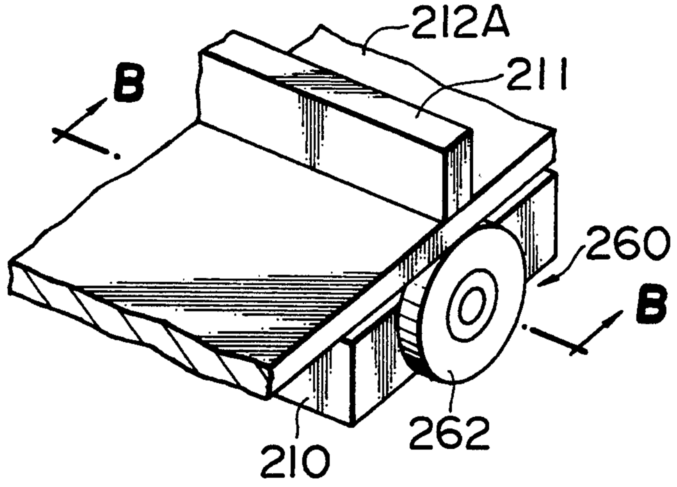
FIG. 31(*a*) is a perspective view showing an embodiment of an image forming apparatus according to the present invention which comprises means for controlling the amount of the image-forming liquid retained on the recording surface of the image-bearing member.
Figure 31B:
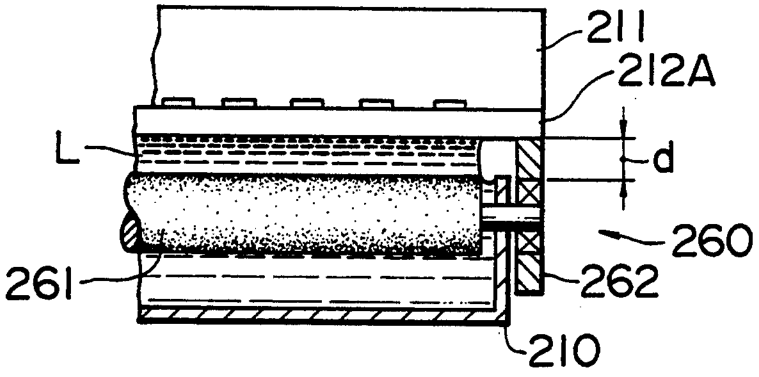

FIG. 31(*a*) is a perspective view showing a further embodiment of the controlling means 260, which is provided for a belt-shaped image-bearing member 212A. FIG. 31(*b*) is a cross-sectional view taken along the line B—B in FIG. 31(*a*).

As shown in FIGS. 31(*a*) and 31(*b*), the controlling means 260 comprises a distance-regulating roller 262, which is coaxially amounted on the axis of an image-forming-liquid supplying roller 261 (hereinafter referred to as a supplying roller). The supplying roller 261 is partially immersed in the image-forming liquid in a container 210. The diameter of the distance-regulating roller 262 is made larger than that of the supplying roller 261 to such a degree that the distance between the supplying roller 261 and the recording surface of the image-bearing member 212A is regulated to an optimal value (d).

Since the distance-regulating roller 262 is turned as the image-bearing member 212A moves, the distance between the supplying roller 261 and the image-bearing member 212A can be fixed, which enables the amount of the image-forming liquid layer (L) supplied to the recording surface of the image-bearing member 212A to be maintained constant. When the image-forming liquid layer (L) is heated by a thermal head 211 through the image-bearing member 212A under the above-mentioned conditions, the finely-divided resin particles can be deposited on the recording surface of the image-bearing member 212A uniformly at any positions on the image-bearing member 212A. This is because the amount of the image-forming liquid layer (L) retained between the image-bearing member 212A and the supplying roller 261 can always be regulated by the distance-regulating roller 262.

It is also possible to maintain the amount of the image-forming liquid supplied to the recording surface of the image-bearing member constant by modifying the configuration of the image-forming-liquid supplying means which is directed to the image-bearing member.

In an image-forming apparatus shown in FIG. 32, an image-bearing member 212A is in the form of an endless belt, and an image-forming-liquid supplying means 220 comprises a container 220A for the image-forming liquid and an image-forming-liquid supplying endless belt 220B (hereinafter referred to as a supplying endless belt), a part of which is immersed in the image-forming liquid in the container 220A. A developing means 203 comprises a development roller 203B.

Figure 32:
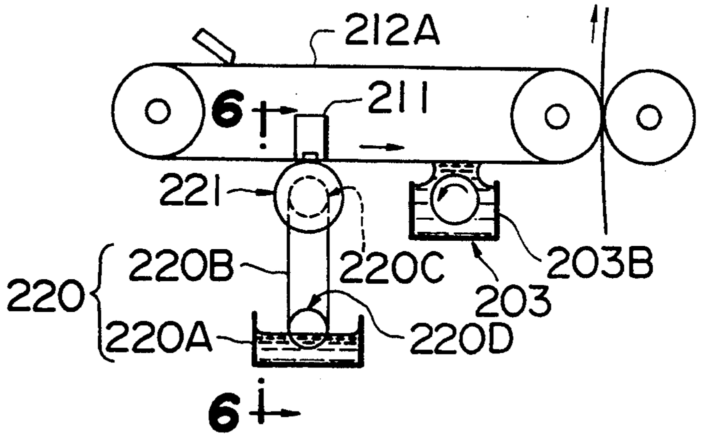
FIG. 32 is a schematic cross-sectional view showing another embodiment of an image forming apparatus according to the present invention which comprises means for controlling the amount of the image-forming liquid retained on the recording surface of the image-bearing member.
Figure 33:
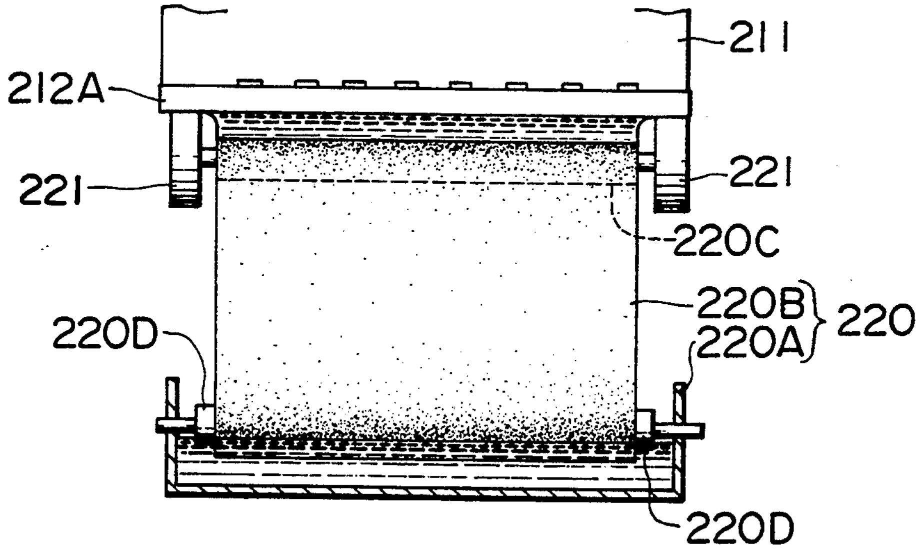
FIG. 33 is a cross-sectional view taken along the line 6—6 in FIG. 32.

FIG. 33 is a cross-sectional view taken along the line 6—6 in FIG. 32. As shown in FIG. 33, the supplying endless belt 220B is turned by pulleys 220C and 220D. A distance-regulating roller 221 is coaxially amounted on the axis of the upper pulley 220C which is positioned at the side of the image-bearing member 212A. The diameter of the distance-regulating roller 221 is made larger than that of the pulley 220C to such a degree that the distance-regulating roller 221 is brought into contact with the recording surface of the image-bearing member 212A, and the distance between the top position of the supplying endless belt 220B and the recording surface of the image-bearing member 212A is regulated to an optimal value.

The present invention will now be explained in detail with reference to the following example of an image forming apparatus of the present invention comprising the above-mentioned controlling means.

EXAMPLE 23

Using the following constituents, the image forming apparatus with a basic structure as shown in FIG. 32 was prepared:

(Image-forming liquid): a 20% colloidal dispersion of ethylene—vinyl acetate (Trademark "S-752", made by Sumitomo Chemical Co., Ltd.)

(Ink for development): a water-soluble dye-containing ink prepared by dissolving 7 wt. % of the same direct dye as used in Example 1 and 2 wt. % of ethylene glycol in 91 wt. % of water.

(Image-bearing member 212A): comprising a silicone rubber.

(Cleaning member 8): comprising a commercially available porous material "Rubysheet" (Trademark), made by Toyo Polymer Co., Ltd., with a mean pore opening of about 10 μm.

In this embodiment, a part for forming latent resin images on the image-bearing member 212A was designed in such a configuration as shown in FIG. 33, by coaxially providing distance-regulating rollers 221 on the axis of a pulley 220C.

By use of the image forming apparatus thus prepared, latent resin images were formed on the recording surface of the image-bearing member 212A by heating the thermal head 211 to 150° C. in accordance with the signals corresponding to an image to be formed. The thus obtained latent resin images were developed into visible ink images with the ink. Then, excellent images were obtained by transferring the ink images to a recording sheet. In addition, the initial image was compared with the image obtained after the thermal head 211 was heated 1000 times. When both images were separately transferred to recording sheets, the latter was as good as the former.

Figure 34:
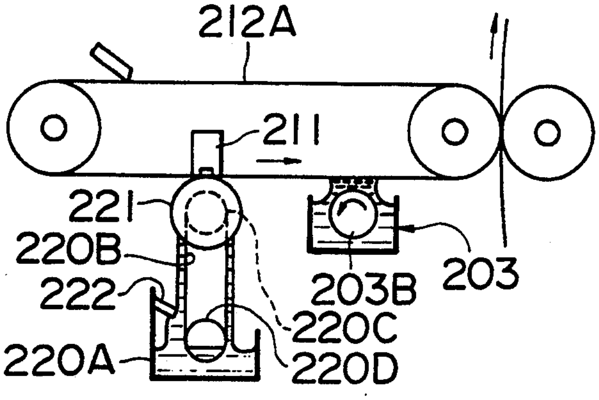
FIG. 34 is a schematic cross-sectional view showing a further embodiment of an image forming apparatus according to the present invention which comprises means for controlling the amount of the image-forming liquid retained on the recording surface of the image-bearing member.

In an image forming apparatus shown in FIG. 34, the amount of the image-forming liquid retained on the supplying endless-belt 220B as shown in FIG. 32 can more accurately be controlled. In this configuration of FIG. 34, an image-forming-liquid thickness regulating means 222 is situated at the side of the supplying endless-belt 220B for the stage prior to the contact of the image-forming liquid on the supplying endless belt 220B with the image-bearing member 212A in the moving direction of the supplying endless-belt 220B. In this embodiment, a blade is used for the image-forming-liquid thickness regulating means 222, and the end portion of the blade is positioned so as to generate a gap between the surface of the supplying endless-belt 220B and the end portion of the blade to such a degree that the thickness of the image-forming liquid retained on the supplying endless-belt 220B can be regulated to an optimal value. Thus, the amount of the image-forming liquid retained on the supplying endless-belt 220B can be made uniform and maintained constant by the image-forming-liquid thickness regulating means 222.

When the gap between the image-bearing member 212A and the top of the supplying endless-belt 220B is controlled by the method as previously explained in FIGS. 32 and 33 after the amount of the image-forming liquid retained on the supplying endless-belt 220B is regulated by the image-forming liquid thickness regulating means 222 as shown in FIG. 34, uniform supply of the image-forming liquid to the image-bearing member 212A can be achieved more efficiently. The supply of an excessive amount of the image-forming liquid to the image-bearing member 212A can be avoided, and therefore, the recording surface of the image-bearing member 212A can uniformly be supplied with a predetermined amount of the image-forming liquid. Thus, overflow of the image-forming liquid from the image-bearing member 212A can be prevented, thereby the inside of the image forming apparatus is not stained with the image-forming liquid.

Figure 35A:
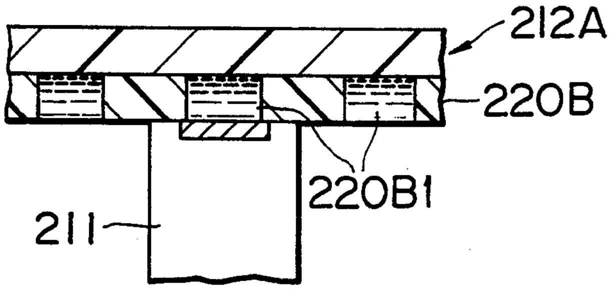
FIGS. 35(*a*) and (*b*) are partial cross-sectional views showing embodiments of image forming apparatuses according to the present invention which comprise means for controlling the amount of the image-forming liquid retained on the image-forming-liquid supplying means.
Figure 35B:
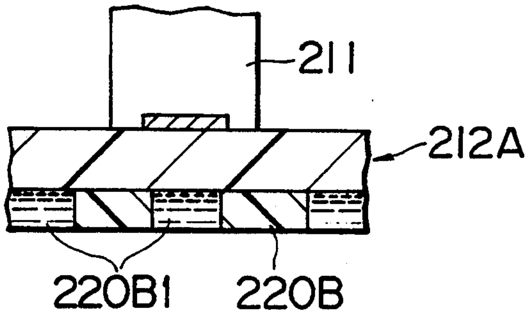
Figure 36A:
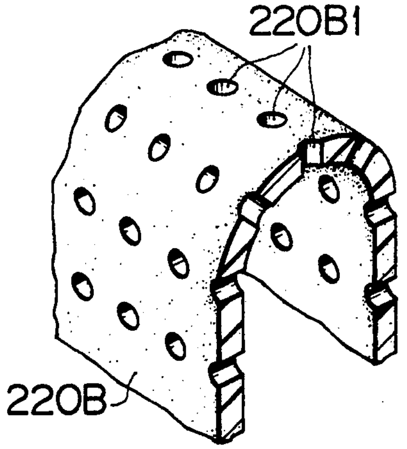
FIGS. 36(*a*) through 36(*d*) are perspective views showing four embodiments of the configuration of the image-forming-liquid supplying means (endless belt) as employed in FIG. 35.
Figure 36B:
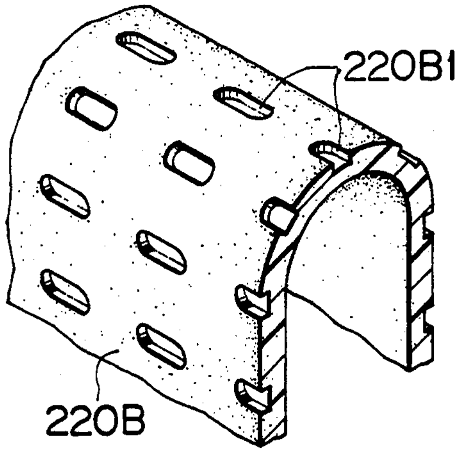
Figure 36C:
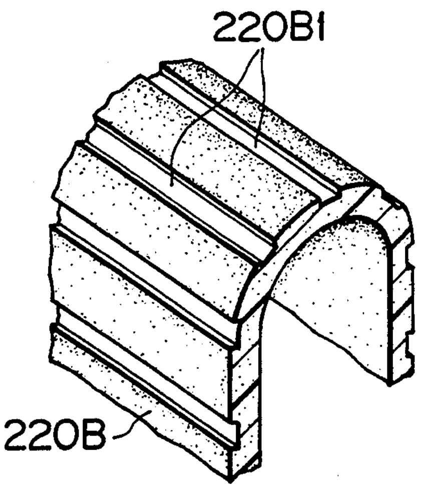
Figure 36D:
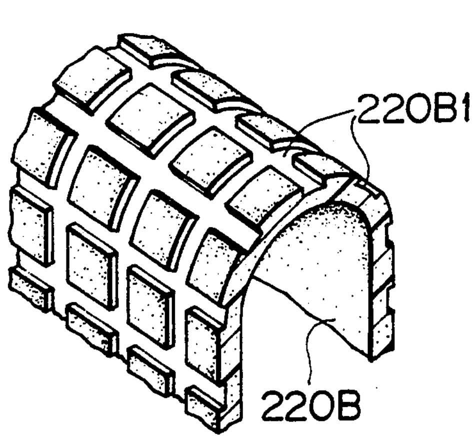
Figure 37:
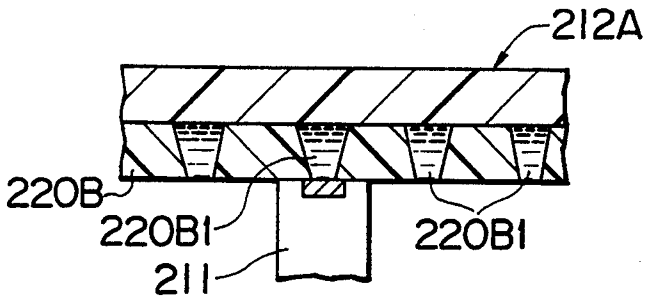
FIG. 37 is a partial cross-sectional view of another embodiment showing an image forming apparatus according to the present invention which comprises means for controlling the amount of the image-forming liquid retained on the image-forming-liquid supplying means.

In FIGS. 35 through 37, a further embodiment of the means controlling the amount of the image-forming liquid supplied to the image-bearing member is illustrated. This embodiment is characterized by providing an image-forming-liquid retaining portions on the supplying endless-belt 220B as shown in FIGS. 32 and 34.

FIGS. 35(*a*) and 35(*b*) are partial cross-sectional views in explanation of the relation of an image-bearing member 212A, a thermal head 211 and an image-forming-liquid supplying means 220B.

A thermal head 211 is situated on the side of an image-forming-liquid supplying means in FIG. 35(*a*), while a thermal head 211 is situated on the opposite side to an image-forming-liquid supplying means with respect to an image-bearing member 212A in FIG. 35(*b*). In either case, a supplying endless-belt 220B has minute image-forming-liquid retaining portions 220B1 penetrating therethrough in the direction of the thickness of the belt.

The uniform image-forming-liquid retaining portions 220B1 (hereinafter referred to as retaining portions) can be formed at predetermined positions on the supplying endless-belt 220B by the conventional etch machining. While the supplying endless-belt 220B passes through the image-forming liquid in the container 220A as shown in FIG. 32, the image-forming liquid is retained in the retaining portions 220B1 of the supplying endless-belt 220B by the action of surface tension. It is possible to retain the same amount of the image-forming liquid in every retaining portion because the thickness of the supplying endless belt 220B is uniform and the retaining portions 220B1 are the same in size.

The retaining portions 220B1 may penetrate through the supplying endless-belt 220B in the thickness direction thereof, or retaining dents not penetrating through the supplying endless-belt 220B may be provided thereon. For instance, not only the retaining portions 220B1 in the form of dot-shaped penetrating holes may be provided on the supplying endless-belt 220B, as shown in FIG. 36(*a*), but also the retaining portions 220B1 in the form of elliptic dents may be provided on the supplying endless-belt 220B, as shown in FIG. 36(*b*). Furthermore, the retaining dents may be provided on the supplying endless-belt 220B in striped pattern as shown in FIG. 36(*c*), and checkered pattern in FIG. 36(*d*).

Furthermore, in the case where the retaining portions 220B1 are in the form of holes penetrating through the supplying endless-belt 220B in the thickness direction thereof, the holes may be tapered in the thickness direction of the belt 220B toward the side of the thermal head 211, as shown in FIG. 37. Owing to such tapered holes, a contact area of the image-forming liquid with the thermal head 211 can be decreased, which can reduce the stain of the heating elements of the thermal head 211 with the image-forming liquid.

Figure 38A:
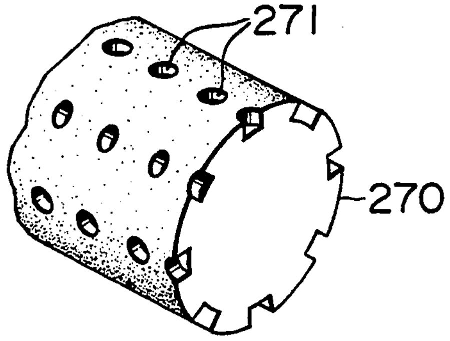
FIGS. 38(*a*) to 38(*c*) are perspective views showing three embodiments of the configuration of the image-forming-liquid supplying means (roller)
Figure 38B:
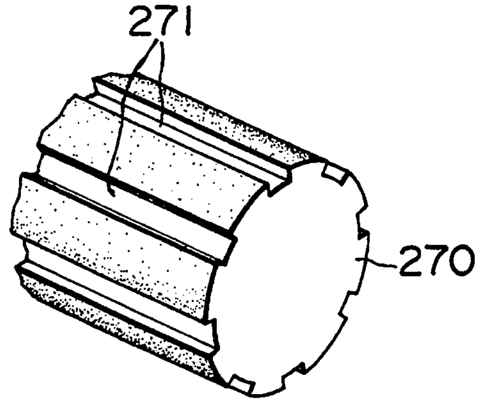
Figure 38C:
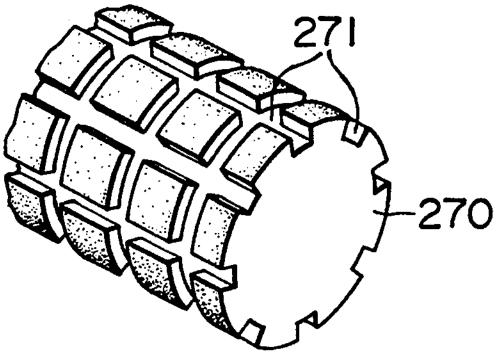

The above-mentioned retaining portions 220B1 can be provided on the supplying roller as well as the supplying endless-belt 220B as illustrated in FIG. 32. In such a case, retaining portions 271 are formed on the surface of a supplying roller 270 in dotted-pattern, in striped patter, and in checkered pattern, as shown in FIGS. 38(*a*), 38(*b*) and 38(*c*), respectively.

The present invention will now be explained in detail with reference to the following example of an image forming apparatus of the present invention comprising the means for controlling the amount of the image-forming liquid retained on the image-forming-liquid supplying means.

EXAMPLE 24

Figure 39:
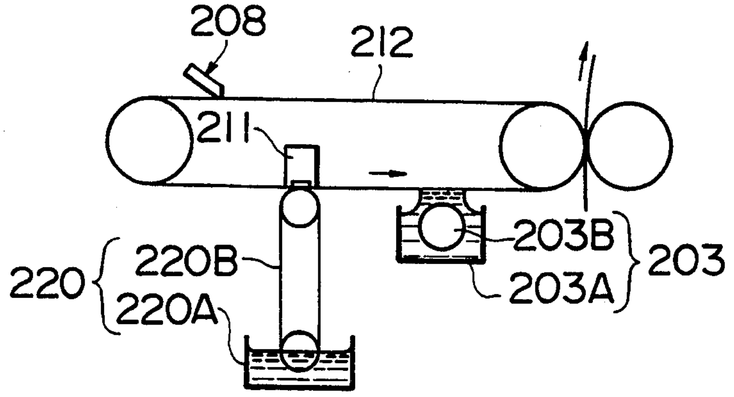
FIG. 39 is a schematic cross-sectional view showing an embodiment of an image forming apparatus according to the present invention, which is used in Example 24.

Using the following constituents, the image forming apparatus with a basic structure as shown in FIG. 39 was prepared:

(Image-forming liquid): a 20% colloidal dispersion of ethylene—vinyl acetate (Trademark "S-752", made by Sumitomo Chemical Co., Ltd.)

(Ink for development): a water-soluble dye-containing ink prepared by dissolving 7 wt. % of the same direct dye as used in Example 1 and 2 wt. % of ethylene glycol in 91 wt. % of water.

(Image-bearing member 212): comprising a silicone rubber.

(Cleaning member 208): comprising a commercially available porous material "Rubysheet" (Trademark), made by Toyo Polymer Co., Ltd., with a mean pore opening of about 10 μm.

In this embodiment, image-forming-liquid retaining portions 220B1 were provided on a supplying endless-belt 220B in such a configuration as shown in FIG. 35(*b*).

By use of the image forming apparatus thus prepared, latent resin images were formed on the recording surface of the image-bearing member 212 by heating the thermal head 211 to 150° C. in accordance with the signals corresponding to an image to be formed. The thus obtained latent resin images were developed into visible ink images with the ink. Then, excellent images were obtained by transferring the ink images to a recording sheet. In addition, the initial image was compared with the image obtained after the thermal head 211 was heated 1000 times. When both images were separately transferred to recording sheets, the latter was as good as the former.

To retain a predetermined amount of the image-forming liquid on the recording surface of the image-bearing member, the image-forming-liquid retaining portions may be provided on the drum-shaped image-bearing member or the image-bearing endless belt. Specifically, the retaining portions as shown in FIGS. 36(*a*) to 36(*d*) may be provided on the image-bearing endless belt, and the retaining portions as shown in FIGS. 38(*a*) to 38(*c*) may be provided on the drum-shaped image-bearing member.

Figure 40A:
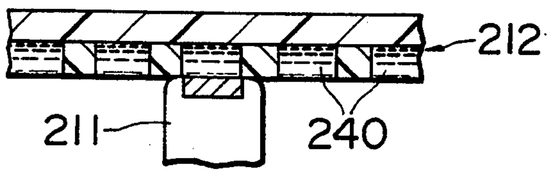
FIGS. 40(*a*) and 40(*b*) are partial cross-sectional views showing a further embodiment of an image forming apparatus according to the present invention which comprises means for controlling the amount of the image-forming liquid retained on the image-bearing member.
Figure 40B:
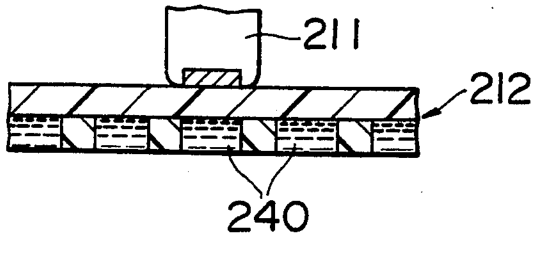

FIGS. 40(*a*) and 40(*b*) are partial cross-sectional views in explanation of the relation of an image-bearing member 212, a thermal head 211 and an image-forming-liquid supplying means.

A thermal head 211 is situated on the side of an image-forming-liquid supplying means in FIG. 40(*a*), while the thermal head 211 is situated on the rear side of an image-bearing member 212, opposite to the image-forming-liquid supplying means with respect to the image-bearing member 212 in FIG. 40(*b*). In either case, image-forming-liquid retaining portions 240 are formed on the recording surface of the image-bearing member 212. In this embodiment, the image-forming liquid is supplied to the image-forming-liquid retaining portions 240 on the image-bearing member 212 before the image-bearing member 212 is directed to the thermal head 211, and retained in the retaining portions 240 by the surface tension. The amount of the image-forming liquid retained in the retaining portions 240 provided overall on the image-bearing member 212 can be maintained constant by providing the retaining portions with the same depth and the same area.

Figure 41:
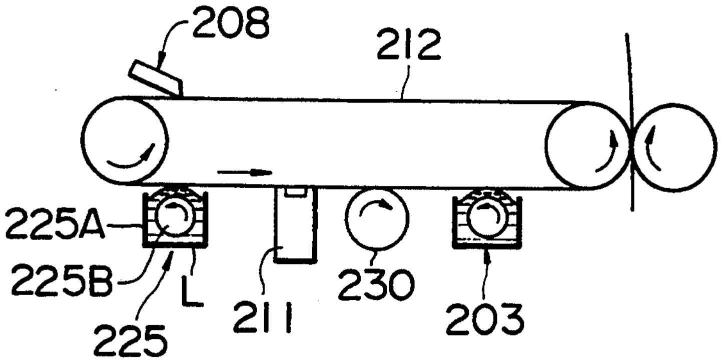
FIG. 41 is a schematic cross-sectional view showing an image forming apparatus according to the present invention which comprises the image-bearing member as shown in FIG. 40(*a*)

In an image forming apparatus shown in FIG. 41, an image-bearing member 212 has the above-mentioned image-forming-liquid retaining portions thereon. The retaining portions may be designed in such a configuration as shown in FIGS. 36(*a*) to 36(*d*). In this embodiment, the relation of the image-bearing member 212 to the thermal head 211 is the same as shown in FIG. 40(*a*). An image-forming-liquid supplying means 225 comprising an image-forming liquid container 225A, and a supplying roller 225B incorporated in the container 225A is located along the image-bearing member 212 upstream with respect to the thermal head 211 in the moving direction of the image-bearing member 212. There are located squeezing means 230 and developing means 203 with the same structure as that in FIG. 32, along the image-bearing member 212 in this order downstream with respect to the thermal head 211.

The squeezing means 230, which is capable of removing the residual image-forming liquid from the recording surface of the image-bearing member 212, employs a rubbing method by use of a roller or a blade, or a sucking method, which will be explained in detail later.

The present invention will now be explained in detail with reference to the following example of an image forming apparatus of the present invention comprising means for controlling the amount of the image-forming liquid retained on the image-bearing member.

EXAMPLE 25

Using the following constituents, the image forming apparatus with a basic structure as shown in FIG. 41 was prepared:

(Image-forming liquid L): a 20% colloidal dispersion of ethylene—vinyl acetate (Trademark "S-752", made by Sumitomo Chemical Co., Ltd.)

(Ink for development): a water-soluble dye-containing ink prepared by dissolving 7 wt. % of the same direct dye as used in Example 1 and 2 wt. % of ethylene glycol in 91 wt. % of water.

(Image-supporting member 212): comprising a silicone rubber.

(Cleaning member 208): comprising a commercially available porous material, "Rubysheet" (Trademark), made by Toyo Polymer Co., Ltd., with a mean pore opening of about 10 $\mu m$.

In this embodiment, image-forming-liquid retaining portions 240 were provided on the recording surface of the image-bearing member 212 as shown in FIG. 40(*a*).

By use of the image forming apparatus thus prepared, latent resin images were formed on the recording surface of the image-bearing member 212 by heating the thermal head 211 to 150° C. in accordance with the signals corresponding to an image to be formed. The thus obtained latent resin images were developed into visible ink images with the ink. Then, excellent images were obtained by transferring the ink images to a recording sheet. In addition, the initial image was compared with the image obtained after the thermal head 211 was heated 1000 times. When both images were separately transferred to recording sheets, the latter was as good as the former.

The above-mentioned embodiments are also applicable to the case where the image-forming liquid comprising a coloring material is employed. More specifically, when the image-forming liquid comprising a coloring material is stored in the container in the image-forming apparatus as shown in FIGS. 28, 29, 32, 39 or 41, the developing means can be omitted. The formation of resin images by depositing the resin particles in the image-forming liquid on the image-bearing member, and the formation of visible images by attaching the coloring material to the resin particles can simultaneously be carried out.

The present invention will now be explained in detail with reference to the following example of an image forming apparatus of the present invention comprising means for controlling the amount of the image-forming liquid retained on the recording surface of the image-bearing member in the case where the above-mentioned image-forming liquid comprises a coloring material.

EXAMPLE 26

Using the following constituents, the image forming apparatus with a structure as shown in FIG. 28 was prepared:

(Image-forming liquid): prepared by dissolving 7 wt. % of the same direct dye as used in Example 1 in a 20% colloidal dispersion of ethylene—vinyl acetate (Trademark "S-752", made by Sumitomo Chemical Co., Ltd.)

(Image-bearing member 212): comprising a silicone rubber.

(Cleaning member 8): comprising a commercially available porous material, "Rubysheet" (Trademark) made by Toyo Polymer Co., Ltd., with a mean pore opening of about 10 $\mu m$.

By use of the image forming apparatus thus prepared, colored resin images were formed on the recording surface of the image-bearing member 212 by heating the thermal head 211 to 150° C. in accordance with the signals corresponding to an image to be formed. Excellent images were obtained by transferring the colored resin images to a recording sheet. In addition, the initial image was compared with the image obtained after the thermal head 211 was heated 1000 times. When both images were separately transferred to recording sheets, the latter was as good as the former.

Using the same constituents as listed above, the image forming apparatuses with a structure as shown in FIGS. 29, 32, 39 and 41 were successively prepared. In the case where the image forming apparatuses with a structure as shown in FIGS. 29, 32, 39 and 41, the developing means was omitted. In any case, excellent images were transferred to a recording sheet. In addition, the initial image was compared with the image obtained after the thermal head 211 was heated 1000 times. When both images were separately transferred to recording sheets, the latter was as good as the former.

As previously explained, with the recording surface of the image-bearing member in contact with the image-forming liquid, the finely-divided resin particles in the image-forming liquid are deposited on the recording surface of the image-bearing member with the application of heat and/or pressure thereto, thereby forming latent resin images on the image-bearing member. The image formation can easily be carried out at low cost according to the image forming method of the present invention.

In addition, when the means for controlling the thickness and the length of the image-forming-liquid layer retained on the recording surface of the image-bearing member is provided at least at the image areas where the resin particles in the image-forming liquid are deposited on the image-bearing member, the amount of the resin particles deposited on the image-bearing member can always be maintained constant. The aforementioned controlling means can prevent the deterioration of the image quality caused by unevenness of the amount of the resin particles deposited on the image-bearing member. In addition, the image-forming liquid is surely retained between the heat-application means and the image-bearing member in the case where the heat-application means is situated on the side of the image-forming liquid, so that the heat-application means can be avoided from coming into contact with image-recorded areas on the image-bearing member. As a result, the images recorded on the image-bearing member can be prevented from being damaged. Furthermore, the harmful influence caused by the excessive supply of the image-forming liquid to the image-bearing member, such as overflow of the image-forming liquid, can be prevented.

In the present invention, it is preferable to provide a means for removing a superfluous image-forming liquid from the image-bearing member. The image-forming liquid is attached to the non-image areas on the image-bearing member when the resin particles are deposited on the image areas thereon. Owing to the means for removing the superfluous image-forming liquid from non-image areas on the image-bearing member, images formed on the image-bearing member are not disturbed. The squeezing means 230 in FIG. 41 is one embodiment of the means for removing the superfluous image-forming liquid from the image-bearing member.

According to the image forming method of the present invention, as previously mentioned, the image-forming liquid comprising the finely-divided resin particles dispersed in the dispersion medium is brought into contact with the image-bearing member capable of repelling the dispersion medium of the image-forming liquid, and heat and/or pressure is selectively applied to the image-bearing member or the image-forming liquid in accordance with the signals corresponding to an image to be formed, thereby depositing the finely-divided resin particles in the image-forming liquid imagewise on the recording surface of the image-bearing member. In the image forming method of the present invention, how to remove the image-forming liquid attached to the non-image areas on the image-bearing member or how to move the image-forming liquid attached to the non-image area to the image area is an important subject in order to improve the image quality. In addition, from the viewpoints of steady development and high speed recording, it is also an important subject how to control the amount of the image-forming liquid accompanied with the finely-divided resin particles within a predetermined range when the resin particles are deposited on the image areas on the image-bearing member.

The present invention will now be explained in detail with reference to the means for removing the superfluous image-forming liquid attached to the image-bearing member.

Figure 42:
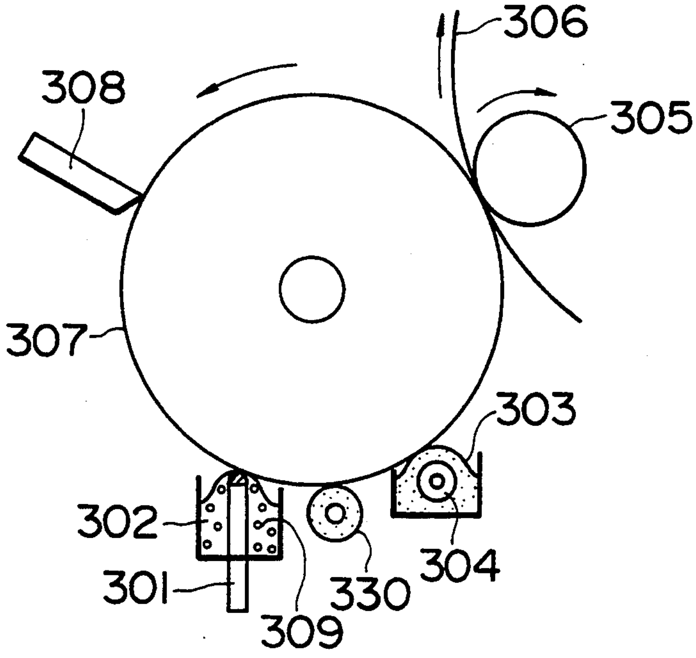
FIG. 42 is a schematic cross-sectional view showing an embodiment of an image forming apparatus according to the present invention which comprises means for removing the superfluous image-forming liquid from the image-bearing member.

(1) Means for removing the superfluous image-forming liquid by the contact method:

The configuration of an image forming apparatus shown in FIG. 42 is almost the same as that in FIG. 1 except that the provision of means for removing the superfluous image-forming liquid attached to the surface of a drum-shaped image-bearing member. In FIG. 42, reference numeral 301 indicates a thermal head; reference numeral 302, an image-forming liquid in which finely-divided resin particles 309 are dispersed; reference numeral 303, an ink for development; reference numeral 304, a development roller; reference numeral 305, a transfer roller; reference numeral 306, a recording sheet; reference numeral 307, a drum-shaped image-bearing member; and reference numeral 308, a cleaning blade.

In this embodiment, a sponge roller 330 serving as the above-mentioned image-forming-liquid removing means is situated in contact with the image-bearing member 307 to remove the superfluous image-forming liquid which adheres to the surface of the image-bearing member 307 when the resin particles in the image-forming liquid are deposited thereon.

According to the image .forming method using the apparatus as shown in FIG. 42, the resin particles 309 in the image-forming liquid 302 are deposited on the surface of the image-bearing member 307 to form latent resin images thereon when heat is selectively applied to the image-forming liquid 302 by use of the thermal head 301 in accordance with the signals corresponding to an image to be formed. Then, the sponge roller 330 sucks up the superfluous image-forming liquid 302 adhering to the surface of the image-bearing member 307. The ink 303 is supplied to the thus conditioned resin images by means of the development roller 304, to develop the latent resin images into visible ink images with the ink 303. After development, the visible ink images formed on the image-bearing member 307 are transferred to the recording sheet 306. The resin particles remaining not transferred to the recording sheet 306 in the transferring process, and paper dust, adhering to the surface of the image-bearing member 307 are cleared therefrom by the cleaning blade 308 prior to the next formation of the resin images on the image-bearing member 307.

Figure 43A:
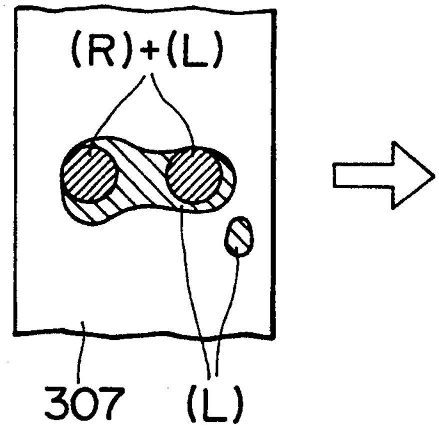
FIGS. 43(*a*) and 43(*b*) are schematic views in explanation of the conditions of an image-forming liquid attached to the recording surface of an image-bearing member.
Figure 43B:
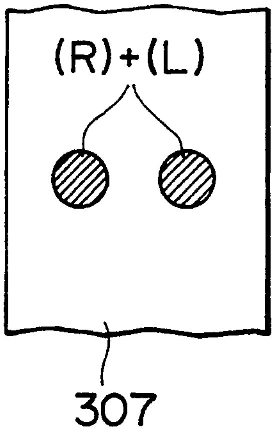

Immediately after the deposition of the resin particles on the image-bearing member 307, the resin particles (R) and the image-forming liquid (L) are attached to image areas (solid areas in the Figure), and the image-forming liquid (L) is also attached to non-image areas (shaded areas in the Figure), as shown in FIG. 43(*a*).

This is because the image-forming liquid (L) comes in contact with not only the image areas, but also non-image areas when the image-forming liquid (L) is brought into contact with the image-bearing member 307 to deposit the resin particles thereon.

After the image-bearing member 307 is brought in rolling contact with the sponge roller 330, the image-forming liquid (L) attached to the non-image areas surrounding the image areas and scattered on the image-bearing member 307 (shaded areas in FIG. 43(*a*)) are sucked up by the sponge roller 330, so that only the resin particles remain attached to the image areas (solid areas), as shown in FIG. 43(*b*). Thus, high quality images can be obtained.

By using the sponge roller 330, the ink for development 303 can be prevented from adhering to the image-forming liquid attached to the non-image areas on the image-bearing member 307. The deterioration of image quality, such as ink deposition of the background and defacement of the recorded characters, can thus be prevented. In addition, since the sponge roller 330 sucks up the superfluous image-forming liquid attached to the non-image area, the image-forming liquid can be prevented from mixing with the ink for development in the development process. Therefore, even though the image forming cycle is repeated for a long period of time, the contamination of the ink with the image-forming liquid can be prevented, so that the concentration of the ink does not decrease and the quality thereof does not deteriorate. Thus, high quality images can be obtained over a long period of time.

In addition, when the amount of the image-forming liquid attached to the image areas can be controlled within the predetermined range, the development can be steadily carried out. Furthermore, when the superfluous image-forming liquid attached to the image areas is controlled by sucking up, the resin images can be dried in a short time, which increases the recording speed. In particular, this improvement is effective when the image-forming-liquid retaining portions are provided on the recording surface of the image-bearing member as shown in FIGS. 40 and 41. The reason for this is that the image-bearing member having the image-forming-liquid retaining portions thereon anyhow necessitates means for removing the residual image-forming liquid in the retaining portions therefrom after the formation of resin images.

Figure 44A:
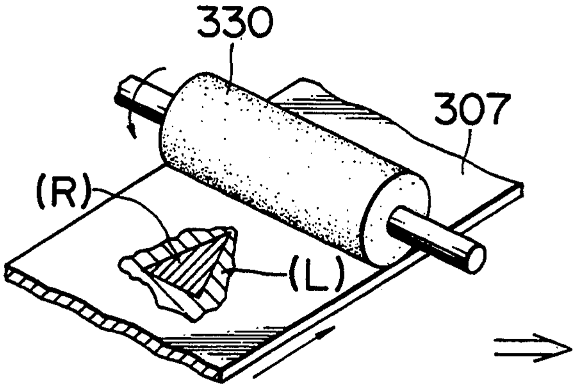
FIGS. 44(*a*) and 44(*b*) are perspective views in explanation of the problem caused when the superfluous image-forming liquid is removed from an image-bearing member by the means for removing the image-forming liquid as shown in FIG. 42.
Figure 44B:
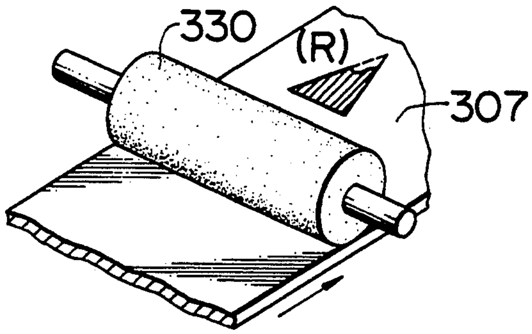
Figure 45A:
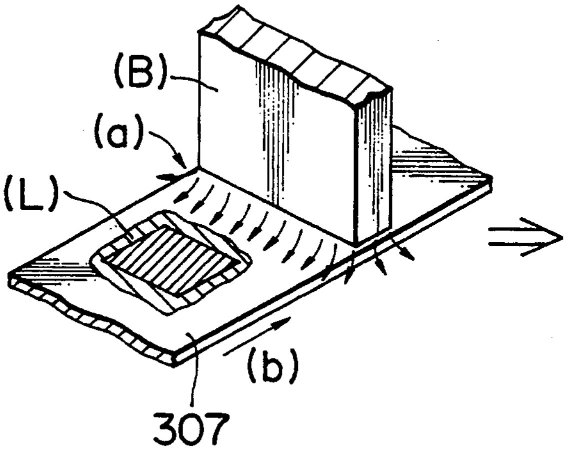
FIGS. 45(*a*) through 45(*d*) are partial perspective views showing two embodiments of the means for removing the superfluous image-forming liquid from the image-bearing member.
Figure 45B:
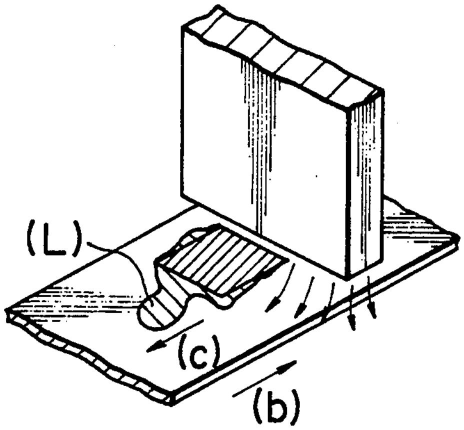
Figure 45C:
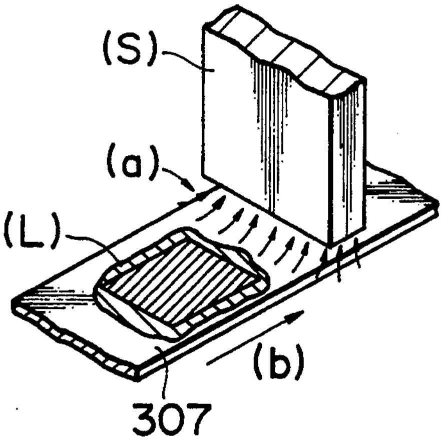
Figure 45D:
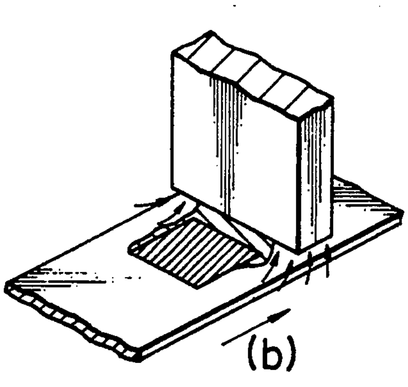

(2) Means for removing the superfluous image-forming liquid by the non-contact method:

When consideration is given to the obtained image quality, it is preferable to remove the superfluous image-forming liquid from the image-bearing member by the means which does not come in contact with the recording surface of the image-bearing member. As shown in FIGS. 44(*a*) and 44(*b*), in the case where the superfluous image-forming liquid (L) adhering to the non-image area (shaded area) is removed by allowing the image-forming-liquid removing means, such as the sponge roller 330, to come in contact with the image-bearing member 307 to suck up the superfluous image-forming liquid (L), it is difficult to control the contact pressure of the sponge roller 330 applied to the image-bearing member 307 and to adjust the gap between the sponge roller 330 and the image-bearing member 307. When the gap between the sponge-roller 330 and the image-bearing member 307 is too small and the resin images (R) deposited on the image-bearing member 307 is thick, there is a risk of the resin image (R) being partially peeled off as shown in FIG. 44(*b*) when the superfluous image-forming liquid (L) is removed by the sponge roller 330.

The embodiments for removing the superfluous image-forming liquid from the image-bearing member by the non-contact method are as follows:

(i) Method of causing air to blow against the recording surface of the image-bearing member 307.

As illustrated in FIGS. 45(*a*) and 45(*b*), the superfluous image-forming liquid (L) on an image-bearing member 307 which is transported in the direction of the arrow (b) is blown away by the blast of air discharged from a blowing apparatus (B) in the directions of the arrows (a). This embodiment can be put into practice by providing means for collecting the superfluous image-forming liquid (L) flowing in the direction of the arrow (c) in FIG. 45(*b*).

(ii) Method of sucking the image-forming liquid (L) together with the suction air into a suction apparatus (S).

As illustrated in FIGS. 45(*c*) and 45(*d*), the superfluous image-forming liquid (L) on an image-bearing member 307 which is transported in the direction of the arrow (b) is sucked into the suction apparatus (S) by the sucking force of air in the directions of the arrows (a). According to this method, the superfluous image-forming liquid can be readily collected without scattering.

(iii) Method of removing the image-forming liquid (L) by gravity.

Figure 46:
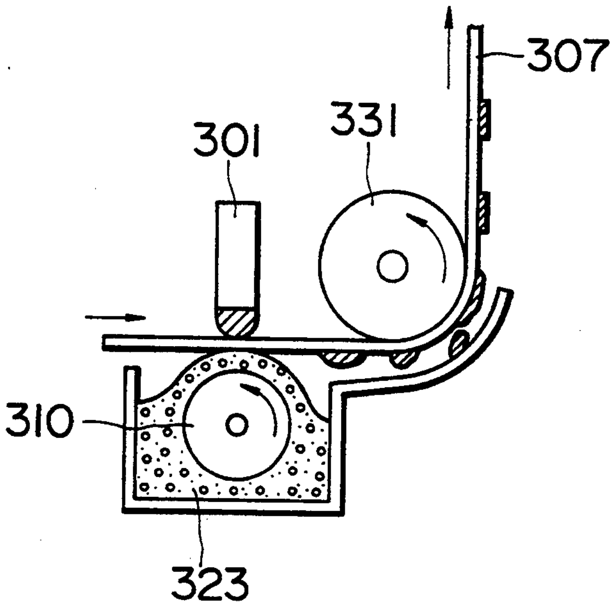
FIGS. 46 through 49 are cross-sectional views showing further embodiments of the means for removing the superfluous image-forming liquid from the image-bearing member.

As illustrated in FIG. 46, an image-bearing member 307 is perpendicularly pulled up by an image-bearing-member feeding roller 331 after the resin particles in the image-forming liquid 323 are deposited on the image-bearing member 307 by supplying the image-forming liquid 323 to the recording surface of the image-bearing member 307 by a supplying roller 310 with the application of heat to the image-bearing member 307 by use of a heat-application means 301. While the image-bearing member 307 is perpendicularly drawn up, the superfluous image-forming liquid attached to the image-bearing member 307 falls down by gravity. This embodiment is very simple, so that it can easily be put into practice. In the embodiment shown in FIG. 46, the developing means can be omitted because the image-forming liquid 323 comprises a coloring material.

(iv) Method of removing the image-forming liquid (L) by the application of vibration.

Figure 47:
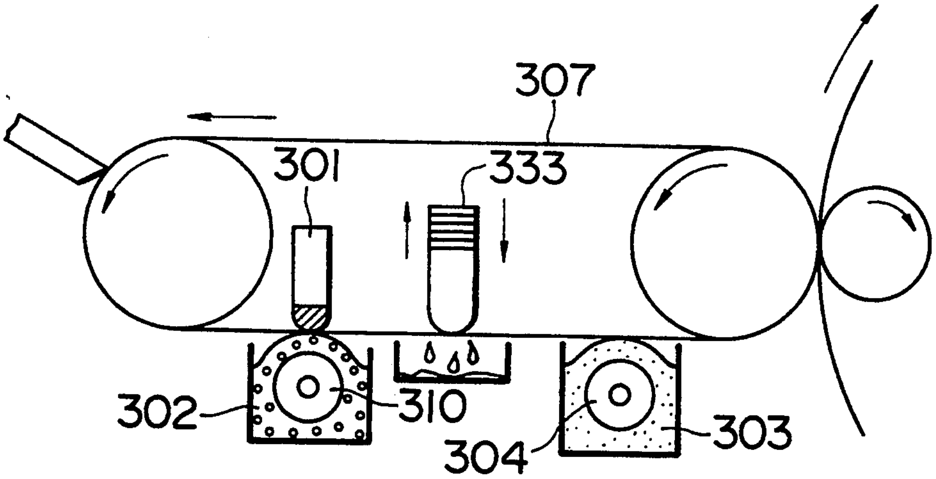

As illustrated in FIG. 47, a vibrator 333 is situated in contact with an image-bearing member 307, between the position where resin images are formed on the image-bearing member 307 by supplying an image-forming liquid 302 to the recording surface of the image-bearing member 307 by a supplying roller 310 with the application of heat to the image-bearing member 307 by use of a heat-application means 301, and the position where the above prepared resin images are developed with an ink 303 supplied to the recording surface of the image-bearing member 307 by a development roller 304. The applied vibration is conducted to the image-bearing member 307, so that the superfluous image-forming liquid 302 shakes off from the image-bearing member 307.

Figure 48:
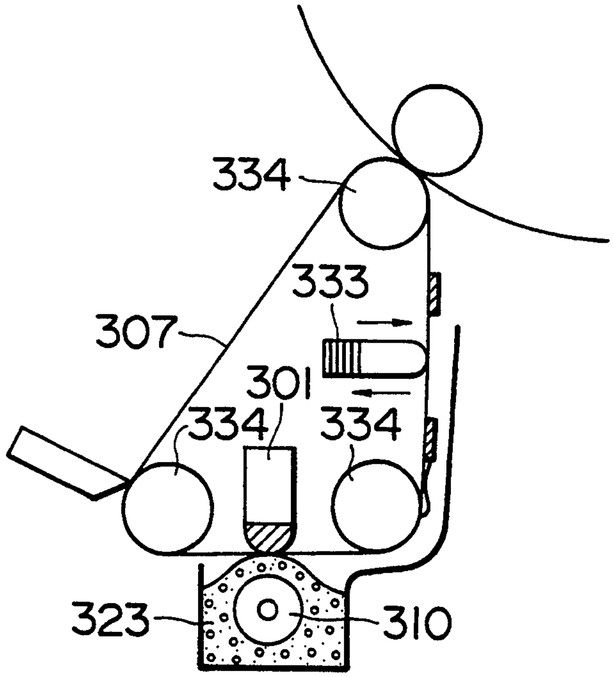

In FIG. 48, the superfluous image-forming liquid is removed from an image-bearing member 307 by gravity and by the aid of vibration.

In an image forming apparatus shown in FIG. 48, the image-bearing member 307 is supported in tension by three image-bearing-member feeding rollers 334, and the image-bearing member 307 is perpendicularly pulled up after the image-bearing member 307 is supplied with an image-forming liquid 323 by means of a supplying roller 310 and heated by use of a heat-application means 301 to deposit the resin particles on the recording surface of the image-bearing member 307. While the image-bearing member 307 is perpendicularly pulled up, vibration is applied to the image-bearing member 307 by a vibrator 333. The superfluous image-forming liquid attached to the image-bearing member 307 drops by gravity and by the aid of vibration. In such an embodiment, a piezoelectric element and a roller having a lot of projections thereon can be used as the vibrators.

In the image-forming apparatus shown in FIG. 47, the formation of latent resin images and development of the resin images are separately carried out. In FIG. 48, the formation of the resin images and the development thereof can simultaneously be achieved. Anyhow, it is possible to remove the superfluous image-forming liquid from the image-bearing member in a restricted space.

(v) Method of removing the image-forming liquid (L) by the application of an electrical field thereto.

Figure 49:
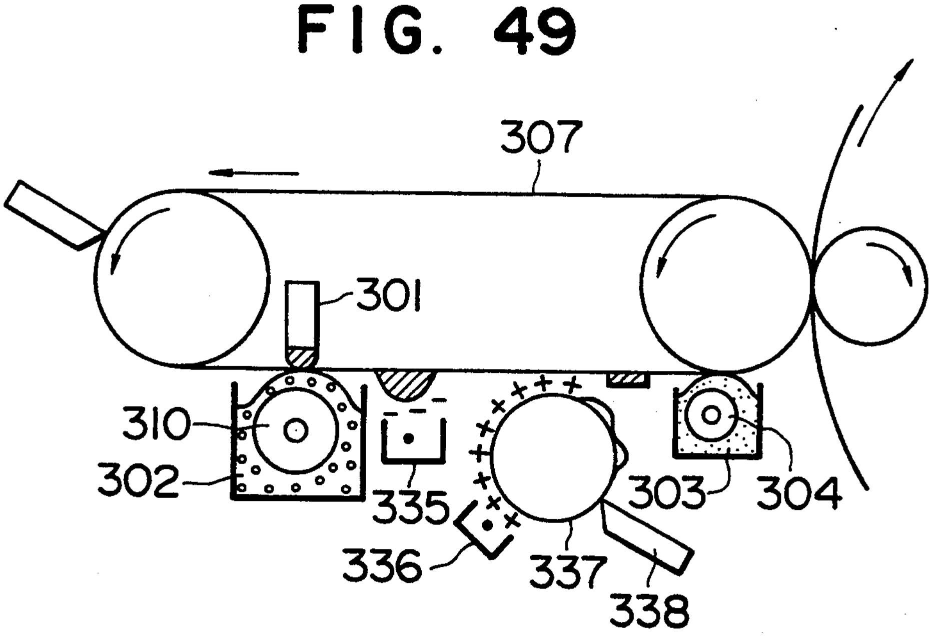

As illustrated in FIG. 49, an electrostatic-charge-application means 335 is situated along an image-bearing member 307 between the position where resin particles in an image-forming liquid 302 are deposited on the recording surface of the image-bearing member 307 by supplying the image-forming liquid 302 to the image-bearing member 307 by a supplying roller 310 with the application of heat to the image-bearing member 307 by use of a heat-application means 301, and the position where the above prepared resin images are developed with an ink 303 which is supplied to the image-bearing member 307 by a development roller 304. In FIG. 49, the superfluous image-forming liquid attached to the image-bearing member 307 is charged to a negative polarity by the electrostatic-charge-application means 335. A roller 337 is located next to the electrostatic-charge-application means 335 along the image-bearing member 307, which roller 337 is charged by an electrostatic-charge-application means 336 to a polarity opposite to that of the above-mentioned superfluous image-forming liquid. In this embodiment, the roller 337 is charged to a positive polarity. When the superfluous image-forming liquid with the negative polarity is directed to the positively-charged roller 336 as the image-bearing member 307 moves in the direction of the arrow, the superfluous image-forming liquid attached to the image-bearing member 307 is electrostatically attracted to the roller 337. Thus, the superfluous image-forming liquid can be removed from the image-bearing member 307. The image-forming liquid attached to the roller 337 is cleared therefrom by a cleaning blade 338, and recovered and collected in a container (not shown).

By removing the superfluous image-forming liquid from the image-bearing member according to the above-mentioned non-contact methods (i) to (v), high quality images can be obtained without disturbing the images formed on the image areas of the image-bearing member. Furthermore, reliable development can be carried out by removal of the excessive image-forming liquid, thereby increasing the recording speed. In the above-mentioned methods (i) to (v), the image quality can be further improved by adjusting the wind force, the frequency and amplitude of vibration, and the electrostatic force in view of the image signals and the obtained results of recording.

As previously explained, when the superfluous image-forming liquid attached to the recording surface is removed from the image-bearing member after the resin images are deposited on the image-bearing member, as shown in FIGS. 41 and 42, high quality images can be obtained and development of the latent resin images can steadily be carried out, which increases the recording speed.

In addition, when the superfluous image-forming liquid attached to the recording surface is removed from the image-bearing member by the non-contact method after the resin images are deposited on the image-bearing member, as shown in FIGS. 45 through 49, high quality images can be obtained without disturbing the deposited resin images, and high speed recording can be achieved because development can steadily be carried out.

In the present invention, to efficiently conduct the heat or pressure to the image-forming liquid and the finely-divided resin particles therein, the heat-application means and/or pressure-application means is situated on the side of the image-forming-liquid supplying means, and heat and/or pressure is applied to the image-bearing member from the recording surface thereof, as shown in FIGS. 1, 8, 10, 12 and 13. In this configuration, the image-forming liquid is in direct contact with a thermal head of the heat-application means or a pressure-application part of the pressure-application means. In the present invention, therefore, it is preferable to provide means for cleaning the resin particles attached to the thermal head or pressure-application part (hereinafter referred to as cleaning means). Owing to this cleaning means, the resin particles adhering to the thermal head or pressure-application part can readily be removed even though the recording operation is continued for a long period of time, for instance, by transferring images to a large number of recording sheets. The heat can thus be effectively conducted to the image-forming liquid or the resin particles therein, or the applied pressure can always be made uniform, so that the amount of the resin particles deposited on the image-bearing member can be maintained constant, thereby producing high quality images on the recording sheets. In particular, when both of the heat and pressure are applied to the image-forming liquid by use of the thermal head, the removal of the resin particles from the head surface of the thermal head is of great importance.

Figure 50:
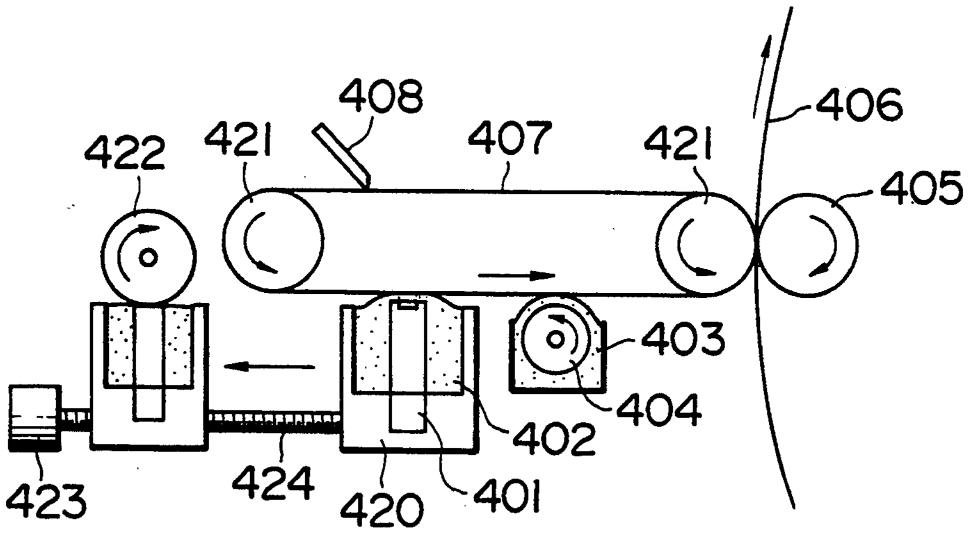
FIG. 50 is a cross-sectional view showing an embodiment of an image forming apparatus according to the present invention which comprises means for cleaning the surface of a heat-application means and/or pressure-application means.

FIG. 50 is a schematic cross-sectional view of one embodiment showing an image forming apparatus comprising the cleaning means for the heat-application means.

In the image forming apparatus shown in FIG. 50, reference numeral 401 indicates a thermal head; reference numeral 402, an image-forming liquid in which finely-divided resin particles are dispersed; reference numeral 403, an ink for development; reference numeral 404, a development roller; reference numeral 405, a transfer roller; reference numeral 406, a recording sheet; reference numeral 407, a drum-shaped image-bearing member; reference numeral 408, a cleaning member for the image-bearing member; reference numeral 420, a container for the image-forming liquid 402; and reference numeral 421, image-bearing-member feeding rollers.

The means for cleaning the head surface of the thermal head 401 comprises a cleaning roller 422, a motor 423 and a pole screw 424 for moving the container 420 and the thermal head 401.

The pole screw 424 is screwed on the bottom portion of the image-forming liquid container 420 in which the thermal head 401 is fixed. When a motor 423 is actuated, the pole screw 424 is turned to move the container 420 to a position where the head surface of the thermal head 401 incorporated in the container 420 comes in contact with the cleaning roller 422. For example, a commercially available porous material, "Rubycell" (Trademark), made by Toyo Polymer Co., Ltd., can preferably be used for the cleaning roller 422. In addition to the above, any material not scratching the surface of the thermal head when coming into contact therewith, for example, a silicone rubber, is applicable.

Figure 51:
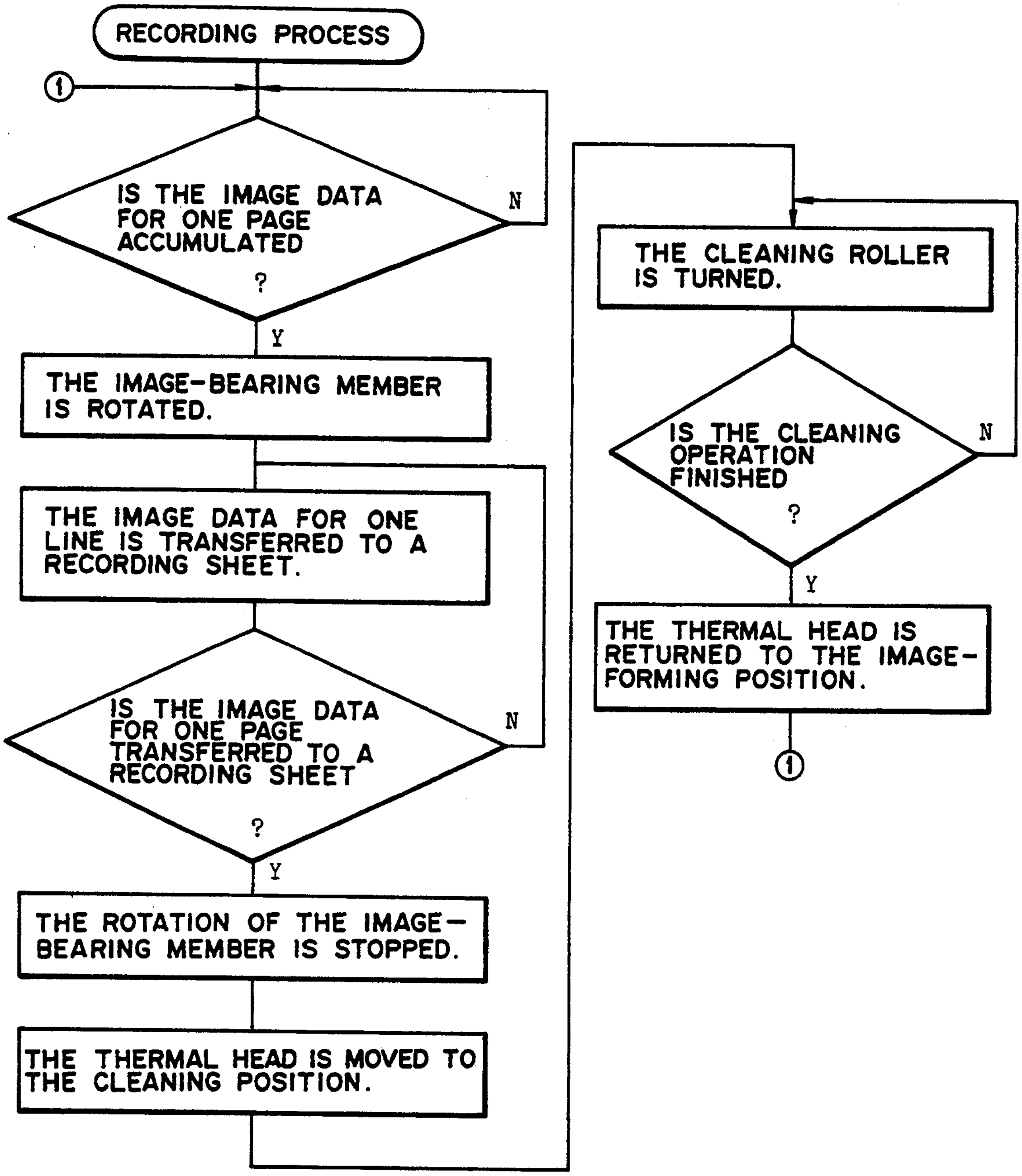
FIG. 51 is a flow chart in explanation of the recording process carried out by the image forming apparatus as shown in FIG. 50.

FIG. 51 is a flow chart in explanation of the recording process carried out in the image forming apparatus shown in FIG. 50. The recording process in the image forming apparatus of FIG. 50 will now be explained with reference to FIGS. 50 and 51.

At the initiation of the recording process, the image forming apparatus shown in FIG. 50 continues to assume a standby state until the image data for one page is accumulated. When the volume of the image data comes to a predetermined printable dot number for one page, or a form feed command appears, the image-bearing member 407 is rotated to start the image formation. At the initial stage, when the thermal head 401 is not at an image-forming position, as illustrated by a solid line in FIG. 50, the motor 423 is driven to move the thermal head 401 to the image-forming position. Then, in accordance with the image data, the finely-divided resin particles in the image-forming liquid 402 are deposited imagewise on the recording surface of the image-bearing member 407 line by line with the application of heat to the image-forming liquid 402 by use of the thermal head 401. Thus, latent resin images are formed on the recording surface of the image-bearing member 407. Subsequently, the latent resin images thus obtained are developed into visible ink images by supplying the ink 403 to the latent resin images by the development roller 404, thereby forming visible ink images on the image-bearing member 407. The visible ink images formed on the image-bearing member 407 are transferred to the recording sheet 406 transported by the transfer roller 405.

After the image data for one page is transferred to the recording sheet 406 in the above-mentioned manner, the rotation of the image-bearing member 407 is stopped, and the motor 423 is driven to move the thermal head 401 to a cleaning position, as illustrated by a two-dot chain line in FIG. 50. When the thermal head 401 is properly brought into contact with the cleaning roller 422 at the cleaning position, the cleaning roller 422 is turned to remove the resin particles attached to the head surface of the thermal head 401. After the completion of the cleaning operation, the thermal head 401 is returned to the original position, that is, the image-forming position, and the recording of the image data for the next page is started.

The present invention will now be explained in detail with reference to the following example of an image forming apparatus of the present invention comprising the above-mentioned cleaning means for the heat-application means.

EXAMPLE 27

Using the following constituents, the image forming apparatus with a structure as shown in FIG. 50 was prepared:

(Image-forming liquid 402): a 20% colloidal dispersion of ethylene—vinyl acetate (Trademark "S-752", made by Sumitomo Chemical Co., Ltd.)

(Ink for development 403): a water-soluble dye-containing ink prepared by dissolving 7 wt. % of the same direct dye as used in Example 1 and 2 wt. % of ethylene glycol in 91 wt. % of water.

(Image-bearing member 407): comprising a silicone rubber.

(Heat-application means): thermal head 401

(Cleaning roller 422): comprising a commercially available porous material, "Rubysheet" (Trademark), made by Toyo Polymer Co., Ltd., with a mean pore opening of about 10 μm.

By use of the image forming apparatus thus prepared, the visible ink images were formed on the image-bearing member 407 and they were transferred to 100 sheets of recording paper in accordance with the above-mentioned recording process. Even after the completion of image-transferring to 100 sheets, excellent images similar to the initial images were obtained on the recording sheet.

In the above embodiment, the cleaning capability for the thermal head can easily be recovered by only replacing the cleaning roller 422 stained with the resin particles with a new one.

Figure 52:
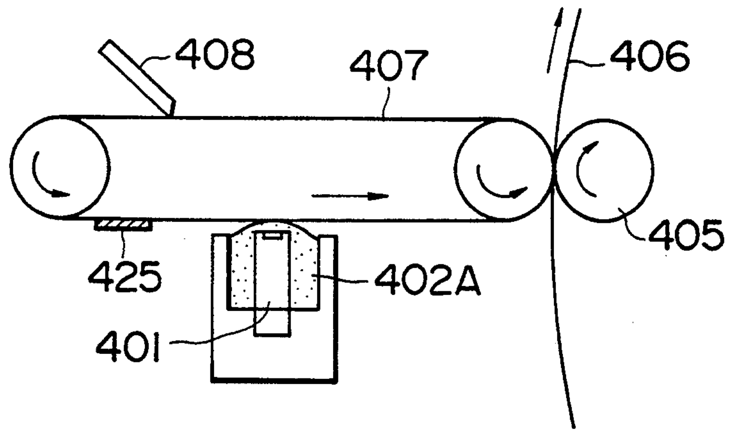
FIG. 52 is a cross-sectional view showing another embodiment of an image forming apparatus according to the present invention which comprises means for cleaning the surface of a heat-application means and/or pressure-application means.

FIG. 52 is a schematic cross-sectional view showing another embodiment of an image forming apparatus comprising the cleaning means for the heat-application means such as a thermal head. In the image forming apparatus shown in FIG. 52, a cleaning member 425 is provided on an image-bearing member 407. In this embodiment, the developing means is omitted because an image-forming liquid 402A comprises a coloring material.

Figure 53:
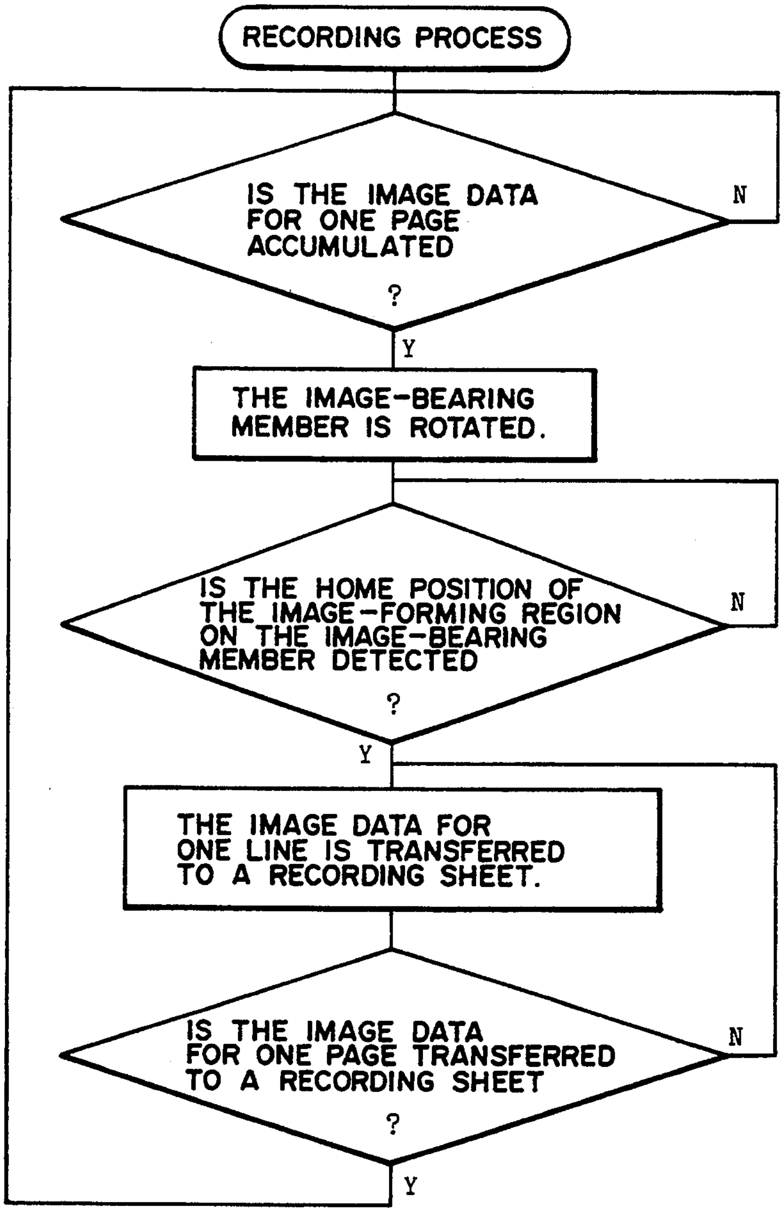
FIG. 53 is a flow chart in explanation of the recording process carried out by the image forming apparatus as shown in FIG. 52.

FIG. 53 is a flow chart in explanation of the recording process carried out in the image forming apparatus shown in FIG. 52. The recording process in the image forming apparatus of FIG. 52 will now be explained with reference to FIGS. 52 and 53.

At the initiation of the recording process, the rotation of the image-bearing member 407 is started in the direction of the arrow when the image data for one page is accumulated. When the home position of an image-forming region on the image-bearing member 407 is detected, the image formation is started. The home position of the image-forming region can be detected by a conventionally known home position detecting means using the combination of a slit provided on the image-bearing member 407 and a light-transmitting type photosensor, or the combination of a line provided on the image-bearing member 407 and a light-reflecting type photosensor.

The colored resin images are deposited imagewise on the recording surface of the image-bearing member 407 line by line from the home position of the image-forming region, with the application of heat to the image-forming liquid 402A by use of a thermal head 401. After the image data for one page is subjected to image-transferring process, the rotation of the image-bearing member 407 is continued and the cleaning member 425 is brought into contact with the head surface of the thermal head 401. Thus, the resin particles attached to the head surface of the thermal head 401 are removed by the cleaning member 425. In this case, the image-bearing member 407 may not forcibly be rotated until the cleaning member 425 is brought into contact with the thermal head 401. The reason for this is because the cleaning member 425 inevitably passes through the thermal head 401 when the image-bearing member 407 is rotated to detect the home position of the image-forming region for starting the image formation for the next page. Therefore, the rotation of the image-bearing member 407 may be stopped after the image data for one page is transferred to a recording sheet 406.

The present invention will now be explained in detail with reference to the following example of an image forming apparatus of the present invention comprising the above-mentioned cleaning means for the heat-application means.

EXAMPLE 28

Using the following constituents, the image forming apparatus with a structure as shown in FIG. 52 was prepared:

(Image-forming liquid 402A): comprising the following components:

| | Wt. % |
|---|---|
| Fluorine-containing acrylate colloidal dispersion "EX-125" (Trademark), made by NOK KLÜBER | 20 |
| C.I. Direct Black 168 | 10 |
| Ethylene glycol | 20 |
| Water | 50 |

(Image-bearing member 407): comprising a silicone rubber.

(Heat-application means): thermal head 401

(Cleaning member 425): prepared by attaching a sheet of a commercially available porous material, "Rubysheet" (Trademark), made by Toyo Polymer Co., Ltd., with a mean pore opening of about 10 μm to the image-bearing member 407.

By use of the image forming apparatus thus prepared, the visible ink images were formed on the image-bearing member 407 and they were transferred to 100 sheets of recording paper in accordance with the above-mentioned recording process. Even after the completion of image-transferring to 100 sheets, excellent images similar to the initial images were obtained on the recording sheet.

In the above embodiment, cleaning of the thermal head can be achieved by a remarkably simple structure.

Figure 54:
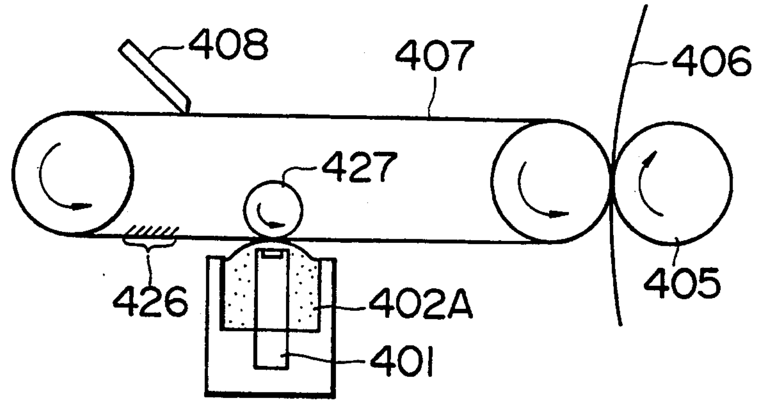
FIG. 54 is a cross-sectional view showing a further embodiment of an image forming apparatus according to the present invention which comprises means for cleaning the surface of a heat-application means and/or pressure-application means.
Figure 55:
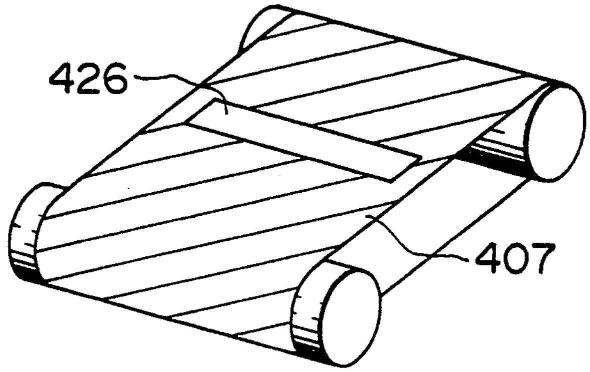
FIG. 55 is a partial perspective view showing an image-bearing member for use in the image forming apparatus as shown in FIG. 54.

FIG. 54 is a schematic cross-sectional view showing a further embodiment of an image forming apparatus comprising the cleaning means for the heat-application means such as a thermal head. FIG. 55 is a perspective view of an image-bearing member 407 for use in the image forming apparatus shown in FIG. 54. In the image forming apparatus, as illustrated in FIGS. 54 and 55, an opening 426 for the cleaning operation is provided on the image-bearing member 407, and a cleaning roller 427 is situated in such a configuration that a thermal head 401 is directed to the cleaning roller 427 through the image-bearing member 407.

The basic recording process and cleaning process for the thermal head 401 are almost the same as those explained in the embodiment shown in FIGS. 52 and 53 except that the cleaning member 425 for use in the image forming apparatus of FIG. 52 is replaced by the opening 426 for the cleaning operation provided on the image-bearing member 407. In this embodiment, the cleaning roller 427 is turned simultaneously with the rotation of the image-bearing member 407, and the cleaning roller 427 is stopped when the rotation of the image-bearing member 407 is terminated. When the position of the opening 426 is coincident with the position of the thermal head 401 as the image-bearing member 407 moves, the head surface of the thermal head 401 comes in contact with the cleaning roller 427 through the opening 426 of the image-bearing member 407, and is cleaned of the resin particles by the cleaning roller 427. The same materials for the cleaning roller 422 in FIG. 50 can be employed for the cleaning roller 427 in FIG. 54.

The present invention will now be explained in detail with reference to the following example of an image forming apparatus of the present invention comprising the above-mentioned cleaning means for the heat-application means.

EXAMPLE 29

Using the following constituents, the image forming apparatus with a structure as shown in FIG. 54 was prepared:

(Image-forming liquid 402A): comprising the following components:

| | Wt. % |
|---|---|
| Fluorine-containing acrylate colloidal dispersion "EX-125" (Trademark), made by NOK KLÜBER | 20 |
| C.I. Direct Black 168 | 10 |
| Ethylene glycol | 20 |
| Water | 50 |

(Image-bearing member 407): comprising a silicone rubber.

(Heat-application means): thermal head 401

(Cleaning roller 427): comprising a commercially available porous material, "Rubysheet" (Trademark), made by Toyo Polymer Co., Ltd., with a mean pore opening of about 10 μm.

By use of the image forming apparatus thus prepared, the visible ink images were formed on the image-bearing member 407 and they were transferred to 100 sheets of recording paper in accordance with the above-mentioned recording process. Even after the completion of image-transferring to 100 sheets, excellent images similar to the initial images were obtained on the recording sheet.

In the above embodiment, cleaning of the thermal head can be achieved by a remarkably simple structure, and the cleaning capability for the thermal head can easily be recovered by only replacing the cleaning roller 427 stained with the resin particles with a new one.

Figure 56:
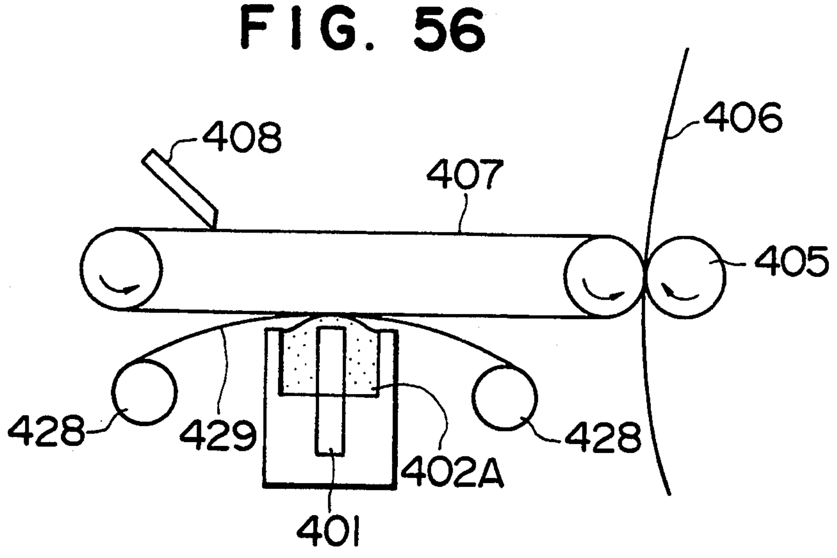
FIG. 56 is a cross-sectional view showing a further embodiment of an image forming apparatus according to the present invention which comprises means for cleaning the surface of a heat-application means and/or pressure-application means.
Figure 57:
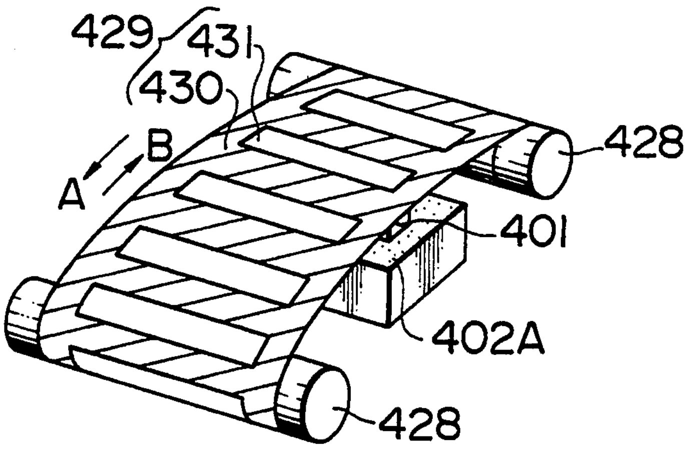
FIG. 57 is a perspective view of the cleaning means employed in the image forming apparatus as shown in FIG. 56.

FIG. 56 is a schematic cross-sectional view showing a further embodiment of the image forming apparatus comprising the cleaning means for the heat-application means such as a thermal head. FIG. 57 is a perspective view of a cleaning means for use in the image forming apparatus shown in FIG. 56.

Figure 58A:
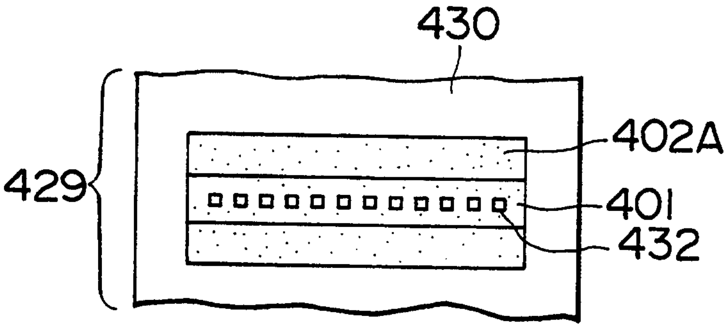
FIGS. 58(*a*) and 58(*b*) are schematic plan views in explanation of the relation between the cleaning means and the heat-application means for use in the image forming apparatus as shown in FIG. 56.
Figure 58B:
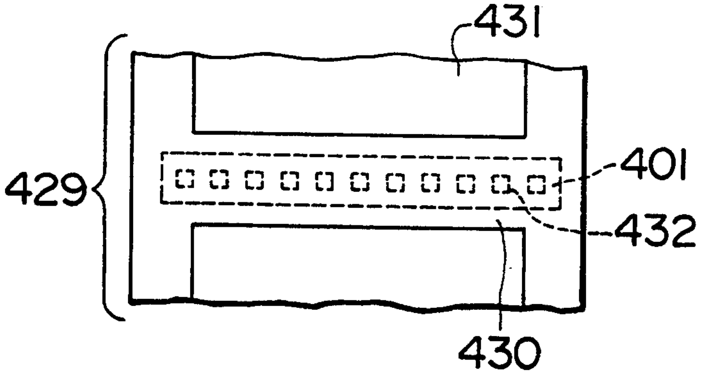

As shown in FIG. 56, a cleaning film 429 is provided between an image-bearing member 407 and a thermal head 401 in the image forming apparatus, and is transported by cleaning-film-feeding rollers 428 driven by a cleaning-film-transporting motor (not shown). A plurality of slits are provided on the cleaning film 429 as shown in FIG. 57, so that the cleaning film 429 comprises an opening portion 431 corresponding to the above-mentioned slits and a cleaning portion 430. When the images are formed on the image-bearing member 407 by depositing the resin particles on the recording surface of the image-bearing member 407, the opening portion 431 on the cleaning film 429 is positioned above the thermal head 401. FIG. 58(*a*) is a plan view showing the relation between the cleaning film 429 and the thermal head 401 during the image forming operation. In the course of the image forming operation, the thermal head 401 comes in direct contact with the image-bearing member 407 through the opening portion 431, or the thermal head 401 is directed to the image-bearing member 407 with a slight gap provided therebetween through the opening portion 431, so that finely-divided resin particles in an image-forming liquid 402A are deposited on the recording surface of the image-bearing member 407 through the opening portion 431 of the cleaning film 429 with the application of heat to the image-forming liquid 402A by use of heating elements 432 of the thermal head 401. In the course of the cleaning operation, the cleaning portion 430 of the cleaning film 429 comes into contact with the heating elements 432 of the thermal head 401, as shown in FIG. 58(*b*).

The cleaning film 429 may be transported in the direction of A or B as shown in FIG. 57. Every time the recording of the image data for a predetermined number of pages is completed, or at intervals of a preset image forming operation time, the cleaning portion 430 which has been subjected to the cleaning operation may be replaced by the following unused cleaning portion 430 one after another. Alternatively, the cleaning film 429 may be bidirectionally transported (in the directions of A and B) to use one cleaning portion 430 a few times.

The present invention will now be explained in detail with reference to the following example of an image forming apparatus of the present invention comprising the above-mentioned cleaning means for the heat-application means.

EXAMPLE 30

Using the following constituents, the image forming apparatus with a structure as shown in FIG. 56 was prepared:

(Image-forming liquid 402A): comprising the following components:

| | Wt. % |
|---|---|
| Fluorine-containing acrylate colloidal dispersion "EX-125" (Trademark), made by NOK KLÜBER | 20 |
| C.I. Direct Black 168 | 10 |
| Ethylene glycol | 20 |
| Water | 50 |

(Image-bearing member 407): comprising a silicone rubber.

(Heat-application means): thermal head 401

(Cleaning film 429): a sheet of a commercially available porous material, "Rubysheet" (Trademark), made by Toyo Polymer Co., Ltd., with a mean pore opening of about 10 μm.

By use of the image forming apparatus thus prepared, the visible ink images were formed on the image-bearing member 407 and they were transferred to 100 sheets of recording paper in accordance with the above-mentioned recording process. Even after the completion of image-transferring to 100 sheets, excellent images similar to the initial images were obtained on the recording sheet.

In the above embodiment, cleaning of the thermal head can be achieved by a remarkably simple structure, and the cleaning capability for the thermal head can easily be recovered by only replacing the cleaning film 429 stained with the resin particles with a new one.

The previously mentioned cleaning means is applicable to the pressure-application part of the pressure-application means for use in the image forming apparatus as shown in FIGS. 12 or 13, as well as to the thermal head of the heat-application and/or pressure-application means.

By providing the means for cleaning the surface of the heat-application and/or pressure-application means, the image forming apparatus of the present invention can produce high quality images for a long period of time. The cleaning means for use in the image forming apparatuses as shown in FIGS. 52, 54 and 56 is simple in structure, so that the cleaning operation can be carried out at a low cost. Furthermore, the cleaning capability can easily be recovered by replacing the used cleaning member such as a cleaning roller or a cleaning film with a new one in the image forming apparatuses shown in FIGS. 50, 54 and 56.

As previously mentioned, according to the image forming method of the present invention, the image-forming liquid comprising finely-divided resin particles dispersed in a dispersion medium is brought into contact with the image-bearing member, and heat and/or pressure is selectively applied to the image-bearing member or the image-forming liquid to deposit imagewise the finely-divided resin particles in the image-forming liquid on the recording surface of the image-bearing member, thereby forming latent resin images on the image-bearing member. This method is capable of speedily forming images at low cost.

When the image-forming liquid comprises a coloring material, that is, a coloring material is dissolved or dispersed in the dispersion medium of the image-forming liquid, or the finely-divided resin particles dispersed in the image-forming liquid comprises a coloring material, the formation of the latent resin images and the development thereof can simultaneously be carried out. According to this method, the image formation can be achieved more speedily and the cost can be further decreased because the developing means can be omitted.

In the case where the image forming apparatus of the present invention further comprises the means for removing the residual finely-divided resin particles which have been deposited on the recording surface of the image-bearing member during the previous image forming process, another resin images can newly be formed on the image-bearing member. Thus, the repeated image formation can be achieved.

Therefore, the image forming method of the present invention can be applied to a variety of image forming apparatuses, such as an image-transfer-type printer, direct-recording-type printer, and printing press, and in addition to the above, to a memory device and a display device.

In the case where the relative moving speed of the image-bearing member to the image-forming-liquid supplying means is made zero in the image forming apparatus of the present invention, the quality of obtained images can be further improved because the mechanical force does not work in the surface direction of the image-bearing member, and therefore, the mechanical abrasion of the resin particles deposited on the recording surface of the image-bearing member can be prevented.

In the case where the image forming apparatus of the present invention further comprises the means for controlling the thickness and length of the image-forming liquid layer retained on the recording surface of the image-bearing member at least at the position where the resin particles are practically deposited on the image-bearing member, the amount of the resin particles deposited on the image-bearing member can be maintained constant. As a result, the deterioration in the image quality caused by unevenness of the amount of the resin particles deposited on the image-bearing member can be prevented. In addition, owing to this controlling means, the image-forming-liquid layer with a predetermined thickness can always be provided between the recording surface of the image-bearing member and the heat-application means in the case where the heat-application means is situated on the side of the image-forming liquid. Therefore, it is possible to ensure the image-forming liquid at the image-forming area between the heat-application means and the recording surface of the image-bearing member, and the heat-application means can be prevented from coming into direct contact with the recording surface of the image-bearing member, thereby protecting the recording surface of the image-bearing member from damage.

In addition, when the thickness and length of the image-forming-liquid layer supplied to the image-bearing member is controlled by the improvement of the image-forming-liquid supplying means, the overflow of the image-forming liquid from the image-bearing member, which is caused by excess of the supplied image-forming liquid, can be avoided.

In the case where the image forming apparatus of the present invention further comprises the means for removing the superfluous image-forming liquid attached to the image areas on the image-bearing member, high quality images can be formed on the image-bearing member, and the development can steadily be achieved, which permits the high speed image-recording. In addition, when the superfluous image-forming liquid is removed from the image-bearing member by the non-contact method, the resin images formed on the image-bearing member are not impaired, so that high quality images can be obtained. This also makes it possible to carry out the development steadily and achieve high speed recording.

In the case where the image forming apparatus of the present invention further comprises the means for cleaning the surface of the heat-application means and/or pressure-application means, the obtained images do not deteriorate even though the image formation is continued for a long period of time. Any of the cleaning means for use in the present invention has a simple structure, so that the cleaning operation can be achieved at a low cost. In addition, the cleaning capability can easily be recovered by replacing the cleaning member such as a cleaning roller or cleaning film stained with the resin particles with a new one.

What is claimed is:

1. An image forming method comprising the steps of:

bringing an image-forming liquid comprising a dispersion medium in pre-established liquid state and finely-divided resin particles dispersed in said dispersion medium into contact with an image-bearing member capable of repelling said dispersion medium of said image-forming liquid, and selectively applying heat and/or pressure to said image-bearing member or said image-forming liquid by use of a heat-application means and/or pressure-application means in accordance with signals corresponding to an image to be formed to deposit imagewise said finely-divided resin particles in said image-forming liquid on the surface of said image-bearing member, thereby obtaining a resin image corresponding to said image on said image-bearing member.

2. The image forming method as claimed in claim 1, further comprising the step of developing said resin image deposited on the surface of said image-bearing member with an ink to obtain an ink image.

3. The image forming method as claimed in claim 2, further comprising the step of transferring said ink image to a recording sheet.

4. The image forming method as claimed in claim 1, wherein said image-forming liquid comprises a coloring material, thereby obtaining a colored resin image on said image-bearing member.

5. The image forming method as claimed in claim 4, wherein said coloring material is dissolved or dispersed in said dispersion medium of said image-forming liquid.

6. The image forming method as claimed in claim 5, further comprising the step of transferring said colored resin image to a recording sheet.

7. The image forming method as claimed in claim 4, wherein said finely-divided resin particles for use in said image-forming liquid comprises said coloring material.

8. The image forming method as claimed in claim 7, further comprising the step of transferring said colored resin image to a recording sheet.

9. The image forming method as claimed in claim 6, further comprising the step of removing said colored resin image from the surface of said image-bearing member prior to the succeeding image formation.

10. The image forming method as claimed in claim 8, further comprising the step of removing said colored resin image from the surface of said image-bearing member prior to the succeeding image formation.

11. An apparatus for forming a resin image on the surface of an image-bearing member by depositing finely-divided resin particles dispersed in a dispersion medium for use in an image-forming liquid on the surface of said image-bearing member capable of repelling said dispersion medium of said image-forming liquid, which comprises:

means for storing said image-forming liquid comprising said dispersion medium in pre-established liquid state and said finely-divided resin particles dispersed in said dispersion medium;

means for supplying said image-forming liquid in said storing means to said image-bearing member in such a fashion that the surface of said image-bearing member comes in contact with said image-forming liquid;

means for selectively applying heat and/or pressure to said image-bearing member or said image-forming liquid, with said image-forming liquid being in contact with said image-bearing member; and means for controlling said heat-application means and/or pressure-application means in accordance with signals corresponding to an image to be formed.

12. The image forming apparatus as claimed in claim 11, further comprising means for supplying an ink to said resin image deposited on the surface of said image-bearing member to develop said resin image to a visible ink image.

13. The image forming apparatus as claimed in claim 12, further comprising means for transferring said visible ink image formed on said image-bearing member to a recording sheet.

14. The image forming apparatus as claimed in claim 13, further comprising means for initializing said image-bearing member by removing said finely-divided resin particles and said ink for development from the surface of said image-bearing member.

15. The image forming apparatus as claimed in claim 11, wherein said finely-divided resin particles for use in said image-forming liquid are colloidal particles.

16. The image forming apparatus as claimed in claim 11, wherein said finely-divided resin particles have a particle diameter of 0.01 to 10 μm.

17. The image forming apparatus as claimed in claim 11, wherein said image-bearing member comprises a silicone resin.

18. The image forming apparatus as claimed in claim 11, wherein said image-bearing member comprises a fluororesin.

19. The image forming apparatus as claimed in claim 11, wherein said image-forming liquid comprises a coloring material, thereby obtaining a colored resin image on said image-bearing member.

20. The image forming apparatus as claimed in claim 19, wherein said coloring material is dissolved or dispersed in said dispersion medium of said image-forming liquid.

21. The image forming apparatus as claimed in claim 19, wherein said finely-divided resin particles for use in said image-forming liquid comprises said coloring material.

* * * * *